(12) United States Patent
Dubey et al.

(10) Patent No.: US 11,436,074 B2
(45) Date of Patent: Sep. 6, 2022

(54) PRUNING AND PRIORITIZING EVENT DATA FOR ANALYSIS

(71) Applicant: Microsoft Technology Licensing, LLC, Redmond, WA (US)

(72) Inventors: Rajeev Dubey, Sammamish, WA (US); David A. Machaj, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 766 days.

(21) Appl. No.: 16/386,626

(22) Filed: Apr. 17, 2019

(65) Prior Publication Data
US 2020/0334093 A1 Oct. 22, 2020

(51) Int. Cl.
*G06F 9/44* (2018.01)
*G06F 11/07* (2006.01)
*G06F 16/28* (2019.01)
*G06K 9/62* (2022.01)

(52) U.S. Cl.
CPC ........ *G06F 11/079* (2013.01); *G06F 11/0778* (2013.01); *G06F 16/285* (2019.01); *G06K 9/6215* (2013.01); *G06K 9/6218* (2013.01)

(58) Field of Classification Search
CPC .. G06F 11/0778; G06F 11/079; G06F 16/285; G06K 9/6215; G06K 9/6218
USPC .................................................. 717/124–133
See application file for complete search history.

(56) References Cited

U.S. PATENT DOCUMENTS 8,935,198 B1* 1/2015 Phillips .................. G06Q 40/00
706/62
10,122,607 B2* 11/2018 Luna ................... H04L 41/0663
2005/0120273 A1 6/2005 Hudson et al.
2008/0103736 A1 5/2008 China et al.
2012/0174212 A1 7/2012 Dart et al.
2015/0193403 A1 7/2015 Zaman et al.
2017/0004184 A1 1/2017 Jain et al.
2017/0004205 A1 1/2017 Jain et al.
(Continued)

OTHER PUBLICATIONS

Parsa et al., "Statistical Based Slicing Method for Prioritizing Program Fault Relevant", 2015, Computing and Informatics, vol. 34, pp. 823-857. (Year: 2015).*
(Continued)

*Primary Examiner* — Ted T. Vo
(74) *Attorney, Agent, or Firm* — Ogilvie Law Firm

(57) ABSTRACT

Dump file content and other event data is pruned and prioritized to assist analysis of hangs, crashes, and other circumstances. An event data pruner condenses or excludes certain event data. A cluster creator creates clusters from pruned and vectorized event data, using a clustering algorithm and a similarity metric, without any prior specification of the desired number of clusters. A cluster ranker ranks clusters according to event data volume and thread importance, thus prioritizing the event data for inspection. A results presenter configures a user interface to present ranked clusters, their associated data, data reduction statistics, regression analysis results, and other data reduction processing results. Thus, the innovative functionality assists analysis and prioritized inspection of event data by an analyst, surfacing organized event data that is relevant to the circumstance under investigation, or supporting comparison of clusters from before and after a change in the circumstance, or doing both.

20 Claims, 7 Drawing Sheets

(56) References Cited

U.S. PATENT DOCUMENTS

2017/0351560 A1    12/2017   Smith et al.
2018/0173698 A1    6/2018   Dubey et al.

OTHER PUBLICATIONS

Adamoli et al., "Trevis: A Context Tree Visualization & Analysis Framework and its Use for Classifying Performance Failure Reports", 2010, ACM, pp. 73-82. (Year: 2010).*
"Bag-of-words model", retrieved from <<https://en.wikipedia.org/wiki/Bag-of-words_model>>, Oct. 13, 2018, 5 pages.
"Call stack", retrieved from <<https://en.wikipedia.org/wiki/Call_stack>>, Feb. 19, 2019, 9 pages.
"Cosine similarity", retrieved from <<https://en.wikipedia.org/wiki/Cosine_similarity>>, Mar. 3, 2019, 6 pages.
"Determining the number of clusters in a data set", retrieved from <<https://en.wikipedia.org/wiki/Determining_the_number_of_clusters_in_a_data_set>>, Feb. 23, 2019, 6 pages.
"Dr. Watson (debugger)", retrieved from <<https://en.wikipedia.org/wiki/Dr._Watson_(debugger)>>, Sep. 13, 2017, 1 page.
"Feature engineering", retrieved from <<https://en.wikipedia.org/wiki/Feature_engineering>>, Feb. 7, 2019, 4 pages.
"Hang (computing)", retrieved from <<https://en.wikipedia.org/wiki/Hang_(computing)>>, Feb. 14, 2019, 3 pages.
"Hierarchical clustering", retrieved from <<https://en.wikipedia.org/wiki/Hierarchical_clustering>>, Mar. 18, 2019, 7 pages.
"Jaccard index", retrieved from <<https://en.wikipedia.org/wiki/Jaccard_index>>, Mar. 14, 2019, 8 pages.
Peter Langfelder, et al., "Defining clusters from a hierarchical cluster tree: the Dynamic Tree Cut library for R", retrieved from <<https://horvath.genetics.ucla.edu/html/CoexpressionNetwork/BranchCutting/>>, 2007, 4 pages.
"Machine learning", retrieved from <<https://en.wikipedia.org/wiki/Machine_learning>>, Mar. 21, 2019, 22 pages.
Oracle Team, "Oracle is hanging? Don't forget hanganalyze and systemstate!", retrieved from <<https://blog.dbi-services.com/oracle-is-hanging-dont-forget-hanganalyze-and-systemstate/>>, Feb. 7, 2014, 9 pages.
"R (programming language)", retrieved from <<https://en.wikipedia.org/wiki/R_(programming_language)>>, Mar. 20, 2019, 15 pages.
"Tf-idf", retrieved from <<https://en.wikipedia.org/wiki/Tf%E2%80%93idf>>, Mar. 11, 2019, 6 pages.
"Thread (computing)", retrieved from <<https://en.wikipedia.org/wiki/Thread_(computing)>>, Feb. 9, 2019, 9 pages.
"Universal Windows Platform", retrieved from <<https://en.wikipedia.org/wiki/Universal_Windows_Platform>>, Mar. 18, 2019, 5 pages.
"Word embedding", retrieved from <<https://en.wikipedia.org/wiki/Word_embedding>>, Mar. 26, 2019, 5 pages.

* cited by examiner

Fig. 14

PRUNING AND PRIORITIZING EVENT DATA FOR ANALYSIS

BACKGROUND

Commercial software is often implemented using multi-thread processes, or multiple communicating or coordinated processes, for example. Monitors, profilers, individual software processes, process threads, and other items may generate traces, notifications, status indications, error messages, alerts, dump files, logs, and other kinds of event data which can aid software developers and testing personnel during their analyses of program behavior and program results (or lack of results).

However, it can be very challenging to locate relevant pieces of event data among the sometimes enormous amounts of data generated. Sifting through data to find what is relevant to a particular debugging or other analysis may be especially difficult when the available data has been generated by or about multiple instances of a program run over a period of days or weeks, for example. Obtaining useful information summaries from relevant data also poses significant technical challenges.

SUMMARY

Some teachings herein were motivated by technical challenges of stack de-duping to aid analysis of process hangs. However, the teachings are not limited to that context. Thus, stacks are one of many kinds of event data to which teachings provided here can be applied, de-duping is one example of prune-and-prioritize functionality taught herein, and process hangs are one example of various circumstances which can be investigated using tools and techniques taught herein. Other technical challenges addressed by the innovations taught here will also be apparent to one of skill from the discussion provided below.

Some embodiments include or communicate with automatic pruning and prioritizing ("prune-and-prioritize") functionality that assists analysis of event data which relates to process hangs or another circumstance that is under investigation by an analyst. Prune-and-prioritize functionality may include an event data pruner which prunes event data by condensing event data or excluding event data or doing both. Prune-and-prioritize functionality may also include a cluster creator which creates clusters based on pruned event data, according to a clustering algorithm and using a similarity metric that quantifies similarity of two or more clusters. In some embodiments, the cluster creator creates clusters without requiring a prior specification of the number of clusters to create. Prune-and-prioritize functionality may also include a cluster ranker which ranks clusters according to one or more factors, thereby prioritizing event data of clusters for inspection through a user interface. A results presenter configures the user interface to present at least a portion of the pruned event data of at least some clusters, according to their cluster ranks. Thus, the prune-and-prioritize functionality assists analysis and prioritized inspection of event data by the analyst, e.g., by surfacing organized event data that is relevant to the circumstance under investigation or by supporting comparison of clusters from before and after a change in the circumstance, or both.

Some embodiments use or perform operations that assist analysis of event data which relates to a circumstance that is under investigation by an analyst. Such operations may include pruning the event data by condensing at least some of the event data or by excluding at least some of the event data or by doing both, and then automatically creating clusters based on pruned event data. The clusters are created according to a similarity metric by using a clustering algorithm, without requiring a prior specification of the number of clusters to create. The operations may also include ranking at least some of the clusters according to one or more factors, thereby prioritizing event data of clusters for inspection, and presenting through a user interface at least a portion of the pruned event data of at least some clusters according to their cluster ranks. These operations assist analysis of the circumstance and its related event data, by surfacing to the analyst organized event data that is relevant to the circumstance, thus allowing prioritized inspection of event data by the analyst.

Other technical activities pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

FIG. 14 is a diagram illustrating a pruned stack.

DETAILED DESCRIPTION

Overview

Figure 1:
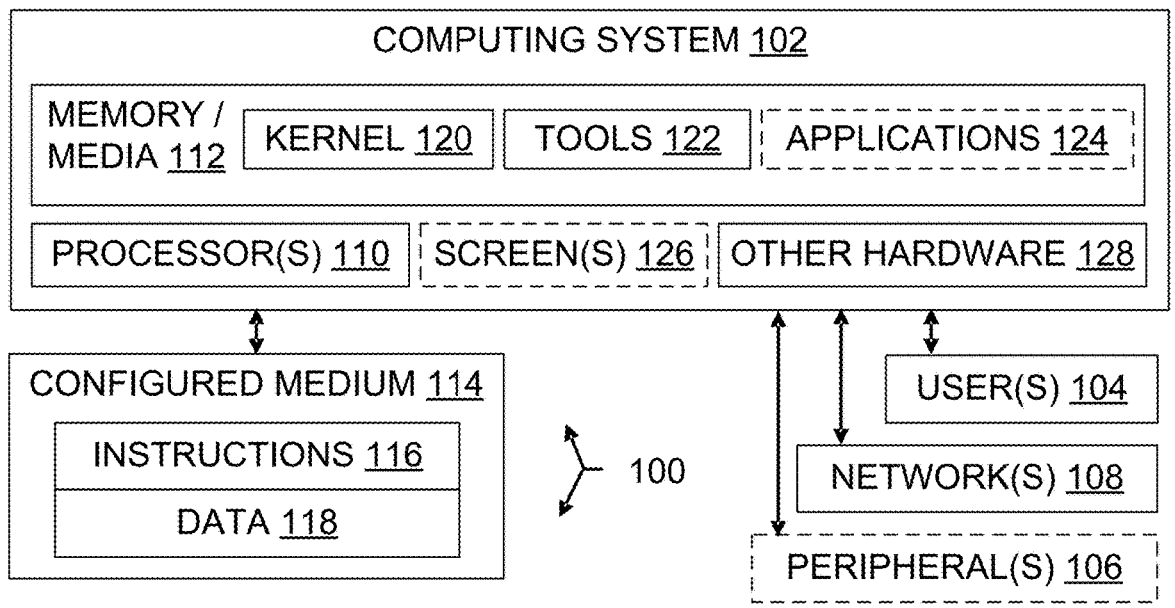
FIG. 1 is a block diagram illustrating computer systems generally and also illustrating configured storage media generally.
Figure 2:
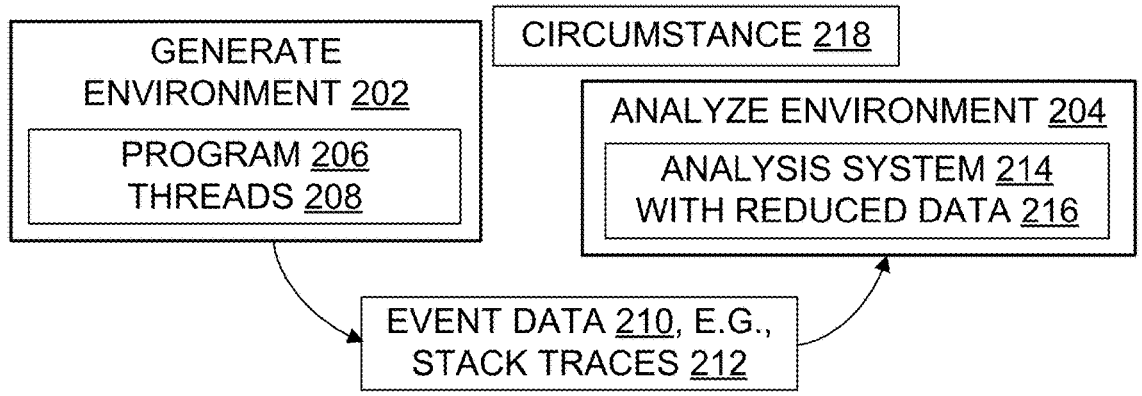
FIG. 2 is a block diagram illustrating some computing environments with event data.

Many innovations expand beyond their origins, but understanding an innovation's origins can help one more fully appreciate the innovation. In the present case, some teachings presented herein were motivated by a technical challenge of creating tools to help analyze process hangs. An associated challenge was how to reduce the amount of stack data in a way that made the amount of data small enough for developers to usefully review within a few hours, or a few days at most, while not obscuring or removing stack data that would help developers understand why the process hangs occurred.

Analyzing process hangs often involves more raw data than other kinds of program analysis. When a multi-threaded process crashes, for example, the underlying cause of the crash can often be found by investigating only a few threads. Sometimes the cause of the crash, such as an attempted division by zero or an attempted access through a bad pointer, can even be identified within a single thread. But when a process hangs, as opposed to crashing, a developer usually has to look at many different threads (often, all of the process threads) while searching for the cause of the hang.

Now consider the multiplying effect of having process memory dump data from hundreds or thousands of instances of a given process, e.g., from copies of a process that is part of a program that was run by different users or from runs of the program at different times by a given user, or both. Even when the data being scrutinized is limited to stack traces, the amount of data available to a developer can be enormous.

For instance, during one two-week period at the end of August 2018, the process hang data available inside Microsoft Corporation for one process under development, known as microsoft.windows.shellexperiencehost, included dump data for more than eighteen million hangs. Each of those hangs was associated with stack data for multiple stacks. A person of ordinary skill in the computing arts will acknowledge that a human person simply cannot scrutinize that much data using mental steps alone before the next two weeks of data has piled up and also awaits scrutiny. Expecting otherwise is like expecting a human to achieve Earth orbit without technological assistance. The backlog of raw data awaiting scrutiny to debug a process hang would simply continue to grow unless (a) much of the hang data was scrutinized inadequately or not at all, or (b) tools were provided to somehow "boil down" the raw hang data into something that is both manageable in size and also helpful in debugging.

Some teachings presented herein use or provide a data pruning-and-prioritizing functionality which can be used, for example, to improve developer productivity for hang analysis. Unlike analysis of a process crash, analysis to find why a process is hanging often involves examining all the threads of the process. This can take a lot of time, even when the raw data represents only a few hundred hang occurrences, much less millions of hangs. In some embodiments, stack frames are collapsed at the top and bottom to reduce noise from code that is probably not responsible for the hang, and then a machine learning algorithm is used to cluster the resulting stacks together. From a developer's perspective, the middle of a stack may be the least interesting part of the stack. Removing some of the middle reduces the amount of work that the clustering algorithm does, and also improves the clustering results because the middle can differ widely for stacks that start and end the same way.

Using these and other teachings provided herein, tens of thousands of stacks may be pruned and then grouped to produce a few hundred clusters, which are still largely representative of the original stacks so far as likely hang causes are concerned. Thus, instead of trying to examine tens of thousands of stacks in a futile effort to stay ahead of a growing backlog of new dump data, the human analyst can focus attention on a few hundred clusters (maybe even fewer) and still identify likely causes of hangs. This innovation results in more productive developers, and in better computing systems as the causes of hangs are identified and then fixed or removed from programs.

Some embodiments described herein may be viewed by some people in a broader context. For instance, concepts such as aiding, compacting, comparing, grouping, presenting, and prioritizing, may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as reducing stack data size without obscuring or deleting aspects of stacks that characterize or indicate hangs. Other configured storage media, systems, and processes involving aiding, compacting, comparing, grouping, presenting, or prioritizing are outside the present scope. Accordingly, vagueness, mere abstractness, lack of technical character, and accompanying proof problems are also avoided under a proper understanding of the present disclosure.

More generally, one of skill will recognize that not every part of this disclosure, or any particular details therein, are necessarily required to satisfy legal criteria such as enablement, written description, or best mode. Also, embodiments are not limited to the particular environments, event data, development tools, identifiers, properties, files, data structures, notations, control flows, similarity metrics, clustering algorithms, vectorizations, pseudocode, or other implementation choices described herein. Any apparent conflict with any other patent disclosure, even from the owner of the present innovations, has no role in interpreting the claims presented in this patent disclosure.

Technical Character

The technical character of embodiments described herein will be apparent to one of ordinary skill in the art, and will also be apparent in several ways to a wide range of attentive readers. Some embodiments address technical activities such as performing computations on megabytes or gigabytes of stack trace event data or on clusters computationally derived therefrom, and extracting and organizing computing system memory dump data to facilitate computational process hang analysis, which are activities deeply rooted in computing technology. Thus, purely mental processes are excluded. Some embodiments improve the functioning of computing systems by enhancing the availability and clarity of data which characterizes or indicates process hangs. Other advantages based on the technical characteristics of the teachings will also be apparent to one of skill from the description provided.

Acronyms, Abbreviations, Names, and Symbols

Some acronyms, abbreviations, names, and symbols are defined below. Others are defined elsewhere herein, or do not require definition here in order to be understood by one of skill.

ALU: arithmetic and logic unit
API: application program interface
BIOS: basic input/output system
CD: compact disc
CPU: central processing unit
DVD: digital versatile disk or digital video disc
FPGA: field-programmable gate array
FPU: floating point processing unit
GPU: graphical processing unit GUI: graphical user interface
IaaS or IAAS: infrastructure-as-a-service
ID: identification or identity
IDS: intrusion detection system, may be or include an HIDS (host-based IDS) or an NIDS (network-based IDS), for example
IoT: internet of things
IP: internet protocol
LAN: local area network
OS: operating system
PaaS or PAAS: platform-as-a-service
RAM: random access memory
ROM: read only memory
SIEM: security information and event management; security information and event management tool
UBA: user behavior analytics
UEBA: user and entity behavior analytics
UEFI: Unified Extensible Firmware Interface
VM: virtual machine
WAN: wide area network
XAML: extensible application markup language Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

As used herein, a "computer system" (a.k.a. "computing system") may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

"Service" means a consumable program offering, in a cloud computing environment or other network or computing system environment, which provides resources or resource access to multiple programs.

"Cloud" means pooled resources for computing, storage, and networking which are elastically available for measured on-demand service. A cloud may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write).

"IoT" or "Internet of Things" means any networked collection of addressable embedded computing nodes. Such nodes are examples of computer systems as defined herein, but they also have at least two of the following characteristics: (a) no local human-readable display; (b) no local keyboard; (c) the primary source of input is sensors that track sources of non-linguistic data; (d) no local rotational disk storage—RAM chips or ROM chips provide the only local memory; (e) no CD or DVD drive; (f) embedment in a household appliance or household fixture; (g) embedment in an implanted or wearable medical device; (h) embedment in a vehicle; (i) embedment in a process automation control system; or (j) a design focused on one of the following: environmental monitoring, civic infrastructure monitoring, industrial equipment monitoring, energy usage monitoring, human or animal health monitoring, physical security, or physical transportation system monitoring. IoT storage may be a target of unauthorized access, either via a cloud, via another network, or via direct local access attempts.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses resource users, namely, coroutines, threads, tasks, interrupt handlers, application processes, kernel processes, procedures, and object methods, for example. "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. Operations such as automatically extracting stack data from dump files, pruning stack data or other event data, quantifying similarity of vectors or clusters by calculating a similarity metric value, creating clusters of vectors in memory, ranking clusters according to factors such as the amount of data associated with respective clusters, configuring a user interface on a screen, calculating a dendogram cutoff, vectorizing a call stack, normalizing a vector stored in RAM, and performing a regression analysis on data stored in digital memory, are understood herein as inherently digital. A human mind cannot interface directly with a CPU or other processor, or with RAM or other digital storage, to read and write the necessary data to perform the event data reduction pruning-and-prioritizing steps taught herein. This would all be well understood by persons of skill in the art in view of the present disclosure, but others may sometimes need to be informed or reminded of the facts.

Unless stated otherwise, embodiments are presumed to be capable of operating at production scale in commercial production environments when properly configured and supplied with data, or in testing labs for production environments, as opposed to being mere thought experiments. "Production scale" means having functionality to prune call stack data of at least thirty threads and create one or more clusters using the pruned call stack data, having functionality to prune call stack data from at least one hundred dump files and create one or more clusters using the pruned call stack data, having functionality to prune at least five thousand pieces of event data (e.g., call stack frames, SIEM alert events, SIEM status events, network packets, log entries, or database records) and create one or more clusters using the pruned event data, having functionality to achieve a twenty-to-one reduction in data size from raw event data to clusters, having functionality in a given analysis environment to reduce event data to clusters at a rate which is at least twice as fast as similar event data becomes available in the analysis environment, or any combination of the foregoing capabilities.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated features is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as associating, calculating, clustering, collapsing, condensing, configuring, creating, cutting, determining, embedding, excluding, executing, generating, hanging, keeping, normalizing, performing, presenting, prioritizing, providing, pruning, quantifying, ranking, reducing, specifying, surfacing, tracing, using, vectorizing (and associates, associated, calculates, calculated, etc.) with regard to a destination or other subject may involve intervening action such as forwarding, copying, uploading, downloading, encoding, decoding, compressing, decompressing, encrypting, decrypting, authenticating, invoking, and so on by some other party, including any action recited in this document, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment
102 computer system, also referred to as computational system or computing system
104 users
106 peripherals
108 network generally, including, e.g., LANs, WANs, software defined networks, clouds, and other wired or wireless networks
110 processor
112 computer-readable storage medium, e.g., RAM, hard disks
114 removable configured computer-readable storage medium
116 instructions executable with processor; may be on removable storage media or in other memory (volatile or non-volatile or both)
118 data
120 kernel(s), e.g., operating system(s), BIOS, UEFI, device drivers
122 tools, e.g., anti-virus software, firewalls, packet sniffer software, intrusion detection systems (IDS), intrusion prevention systems (IPS), debuggers, profilers, compilers, interpreters, software development tools and tool suites, hardware development tools and tool suites, diagnostics
124 applications, e.g., word processors, web browsers, spreadsheets, games, email tools
126 display screens, also referred to as "displays"
128 computing hardware not otherwise associated with a reference number 106, 108, 110, 112, 114
202 environment in which event data is generated, e.g., by a software agent, hardware circuit, program, tool, utility, interrupt handler, exception handler, sniffer, or any other piece of computing technology; event may be generated as electronic signal or digital data or both
204 environment in which generated event data is analyzed
206 program whose behavior is part of the circumstances be investigate
208 threads in a program 206
210 event data
212 stack traces; may also be referred to as "stacks" in the context of event data analysis
214 analysis system, e.g., a computing system configured with software development tools to perform analysis of a program 206; may include a data reduction system 400 as well as debuggers, profilers, test suites, sandboxes, and other software development tools 216 reduced data produced by processing event data, e.g., by condensing data or excluding data or both
218 circumstance that is under investigation by an analyst
302 cloud; may also be referred to as "cloud computing environment"
304 virtual machine, e.g., a computing construct which provides hardware virtualization and includes an operating system; although containers 308 differ from virtual machines as to inclusion of a guest operating system, containers and virtual machines are functionally similar for purposes of the present disclosure, and therefore unless indicated otherwise any reference to virtual machines also refers to containers
306 production environment; may be used as a generate environment
308 container, e.g., a computing construct which provides user space virtualization and does not itself include an operating system
400 computing system configured with event data reduction functionality, e.g., pruning-and-prioritizing functionality (pruning alone would be another example of event data reduction)
402 large collection of event data, e.g., call stack data of at least thirty threads, call stack data from at least one hundred dump files, call stack data from at least one hundred hangs, at least five thousand pieces of event data (e.g., call stack frames, SIEM alert events, SIEM status events, network packets, log entries, or database records), or any combination of the foregoing
404 clusters produced from event data
406 cluster creator code; may also be used to refer to supporting hardware
408 clustering algorithm; also refers to code implementing clustering algorithm
410 cluster similarity metric; also refers to code implementing cluster similarity metric
412 event data pruner code; may also be used to refer to supporting hardware
414 cluster ranker code; may also be used to refer to supporting hardware
416 user interface
418 computational results in a form suitable for configuring the user interface; also refers to information presented in a user interface in human-readable form, or suitable to be thus presented in a user interface
420 results presenter code
502 stack, a.k.a. "call stack"; a stack is a list of frames, where a frame is of format <ModuleName>!<Function Signature> or the like (e.g., separators other than exclamation mark may be used)
504 computational process, which may include one or more threads of execution
506 log, e.g., data in syslog or Windows® event log format (mark of Microsoft Corporation)
508 activity, e.g., an occurrence or a change in status in a computing system
510 status, e.g., a state or condition at a particular point in time in a computing system
512 trace, e.g., record or list
514 entity in a computing system, e.g., a particular piece of software, particular piece of hardware, or particular computing system resource
602 cosine similarity metric; as to all "metrics", the reference numeral also refers to code implementing the respective metric
604 Jaccard similarity metric, or variation thereof such as Tanimoto similarity metric or Tanimoto distance
606 distance metric
608 Euclidean distance metric
610 Manhattan distance metric
702 hierarchical clustering algorithms; as to all "algorithms", the reference numeral also refers to code implementing the respective algorithm
704 hierarchical agglomerative clustering algorithm
706 hierarchical divisive clustering algorithm
708 density-based spatial clustering of applications with noise (DBSCAN) clustering algorithm
710 ordering points to identify the clustering structure (OPTICS) clustering algorithm
802 cluster ranking factors; also referred to as cluster ranking criteria
804 volume of event data associated with a cluster; may be measured, e.g., as the number of individual pieces of event data, or groups of event data (e.g., a call stack, a log), or as the amount of storage occupied by the event data
806 presence of high importance event data, e.g., event data which is in a high importance data category
808 high importance data category or data therein, e.g., data pertaining to user interface threads, or data pertaining to a process which has real-time performance requirements, or data pertaining to a process which is on a critical path; may also refer to an event data category generally, when "high importance" is not stated or implied by context
902 amount of event data processed; may be measured, e.g., as the number of individual pieces of event data, or groups of event data (e.g., a call stack, a log), or as the amount of storage occupied by the event data
904 number of clusters created by processing event data
906 amount of event data not previously seen by the system 400; may be measured, e.g., as the number of individual pieces of event data, or groups of event data (e.g., a call stack, a log), or as the amount of storage occupied by the event data
908 confidence level in an association of event data with a particular cluster; may be expressed, e.g., as a percentage or as a value in the range 0 . . . 1
910 amount of event data seen and processed but not thereby associated with any cluster; may be measured, e.g., as the number of individual pieces of event data, or groups of event data (e.g., a call stack, a log), or as the amount of storage occupied by the event data
912 identification of event data seen and processed but not thereby associated with any cluster; may be an index, address, name, hash, or other identifying value
1002 memory dump file; may also contain other state information and metadata
1004 extract one or more stack traces from a dump file
1006 create clusters
1008 prioritize clusters for presentation to an analyst, e.g., by ranking them
1010 prioritized clusters
1012 calculate results, e.g., perform regression analysis, count event data which was seen but not associated with any cluster
1014 configure user interface with results
1018 present results to analyst via configured user interface
1102 dendogram
1200 flowchart; 1200 also refers to data reduction methods illustrated by or consistent with the FIG. 12 flowchart
1202 prune event data 1204 condense event data; may also be referred to as "collapse" event data 1206 exclude event data from pruned data 1208 associate event data with a particular cluster 1210 assist investigation of circumstances 1212 inspect results of data reduction and other processing 1214 analyze process hang or other circumstance 1300 flowchart; 1300 also refers to data reduction methods illustrated by or consistent with the FIG. 13 flowchart (which incorporates the steps of FIG. 10 and FIG. 12)

1302 provide through computational activity a data reduction having a ratio 1304

1304 data reduction ratio between input data and output data, e.g., input dump files and output clusters or input stack traces and output clustered vectors, etc.

1306 cut (delete, remove, exclude) stack frames from a stack trace 1308 stack frame, e.g., a call to a particular routine as recorded in a stack trace 1310 interior of a stack trace, namely, one or more stack frames between the first routine call recorded in the stack trace and the last routine call recorded in the stack trace 1312 vector 1314 avoid requiring a priori knowledge or other specification of exactly how many clusters to create 1316 vectorize data 1318 textual bag-of-words, e.g., a data structure in which words from a text are represented as to their quantity in the text but not as to their relative order in the text 1320 word embedding: one or more techniques for creating vectors from text words using, e.g., a neural network, dimensionality reduction on a word co-occurrence matrix, a probabilistic model, an explainable knowledge base method, or an explicit representation based on the context in which words appear; may be implemented using, e.g., Tomas Mikolov's Word2vec code, Stanford University's GloVe code, or other code (marks of their respective owners)

1322 use term frequency—inverse document frequency 1324

1324 term frequency—inverse document frequency ("TF-IDF"); term frequency (TF) may be calculated, e.g., as the number of times a term appears in a document, or as a value based on that but also on document length or logarithmic scaling or the frequency of the most-used term in the document; inverse document frequency (IDF) is a measure of how rare or common a term is across a set of documents; TF-IDF is based on a product of TF and IDF 1326 generate a dendogram by hierarchical clustering 1328 calculate a dendogram cutoff 1330 dendogram cutoff, e.g., a clustering level or other boundary in a dendogram that delimits a set of clusters that are all leaves of a dendogram subtree 1332 determine that a computational process satisfied a hang condition 1334 satisfy a hang condition 1336 a hang condition, e.g., one or more threads of a computational process timed out without measurable activity 1338 hang; a computational process hangs when it becomes unresponsive, or is not making expected progress toward a computational result 1340 crash; a computational process crashes when it attempts to perform an illegal or undefined operation, e.g., division by zero or accessing data at an invalid address 1342 be crashed; a computational process is crashed (a.k.a. halted or terminated) when its operation is forcibly halted by or on behalf of a developer 1344 normalize a vector 1346 quantify similarity of clusters or of vectors; may also be referred to as using or applying a similarity metric or a similarity measure 1348 perform a regression analysis 1350 a regression analysis 1352 keep a module name in a condensed stack frame but do not keep the name of the particular routine called 1354 module name; may also be called a package name or a library name in some embodiments 1356 routine name, that is, the name of a particular function, procedure, handler, or other routine 1358 any step discussed in the present disclosure that has not been assigned some other reference numeral Operating Environments With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 126 may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated.

System administrators, network administrators, cloud administrators, security analysts and other security personnel, operations personnel, developers, testers, engineers, auditors, and end-users are each a particular type of user 104. Automated agents, scripts, playback software, devices, and the like acting on behalf of one or more people may also be users 104, e.g., to facilitate testing a system 102. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one processor 110. The computer system 102, like other suitable systems, also includes one or more computer-readable storage media 112. Storage media 112 may be of different physical types. The storage media 112 may be volatile memory, non-volatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage medium 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, and/or GPUs), memory/storage media 112, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments peripherals 106 such as human user I/O devices (screen, keyboard, mouse, tablet, microphone, speaker, motion sensor, etc.) will be present in operable communication with one or more processors 110 and memory.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which may be present in a given computer system. Virtualizations of networking interface equipment and other network components such as switches or routers or firewalls may also be present, e.g., in a software defined network or a sandboxed or other secure cloud computing environment. A given embodiment may also communicate technical data and/or technical instructions through direct memory access, removable nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

More About Systems

With reference to FIGS. 1 through 11, some embodiments use or provide a functionality-enhanced system 400 in an analysis computing system 214. The functionality enhancement promotes process hang analysis, for example, by reducing the amount of hang data and by prioritizing it for inspection, thus allowing analysts to more efficiently and effectively focus their efforts to determine the reason(s) underlying the process hang event(s).

As illustrated in FIG. 1, some environments 100 include one or more generate environments 202 which generate event data 210 about a process hang or other circumstances. The illustrated environment also includes one or more analyze environments 204 in which analysts 104 scrutinize that generated event data 210—possibly in a highly processed form—as the analysts 104 attempt to determine the root causes of the process hang(s) or otherwise investigate circumstances reflected in the data 210.

In the illustrated example, computational processing hangs experienced by a program 206 generate event data 210 that includes stack traces 212 of program threads 208. That raw data is reduced to reduced data 216 using data reduction tools and techniques taught herein, in order to facilitate investigation of the hang, which is done with an analysis computing system 214.

In some alternative configurations, the generate environment 202 and the analyze environment 204 are the same environment. Indeed, an analysis system 214 may be used to aid investigation of itself, when the program 206 previously ran (and hung) on that same analysis system 214.

Figure 3:
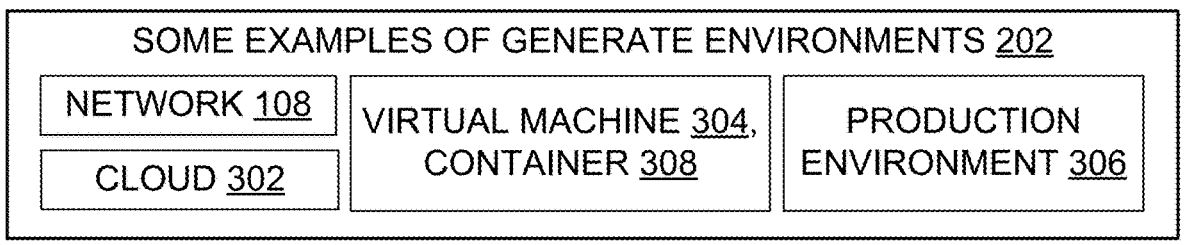
FIG. 3 is a block diagram illustrating some examples of event data generation environments.

Some generate environments 202 are illustrated in FIG. 3. Examples shown include networks 108, clouds 302, virtual machines 304, containers 308, and production environments 306. One of skill will acknowledge that these examples can overlap, e.g., virtual machines may be part of a software-defined network in a cloud computing environment which is in commercial use as a production environment.

Figure 4:
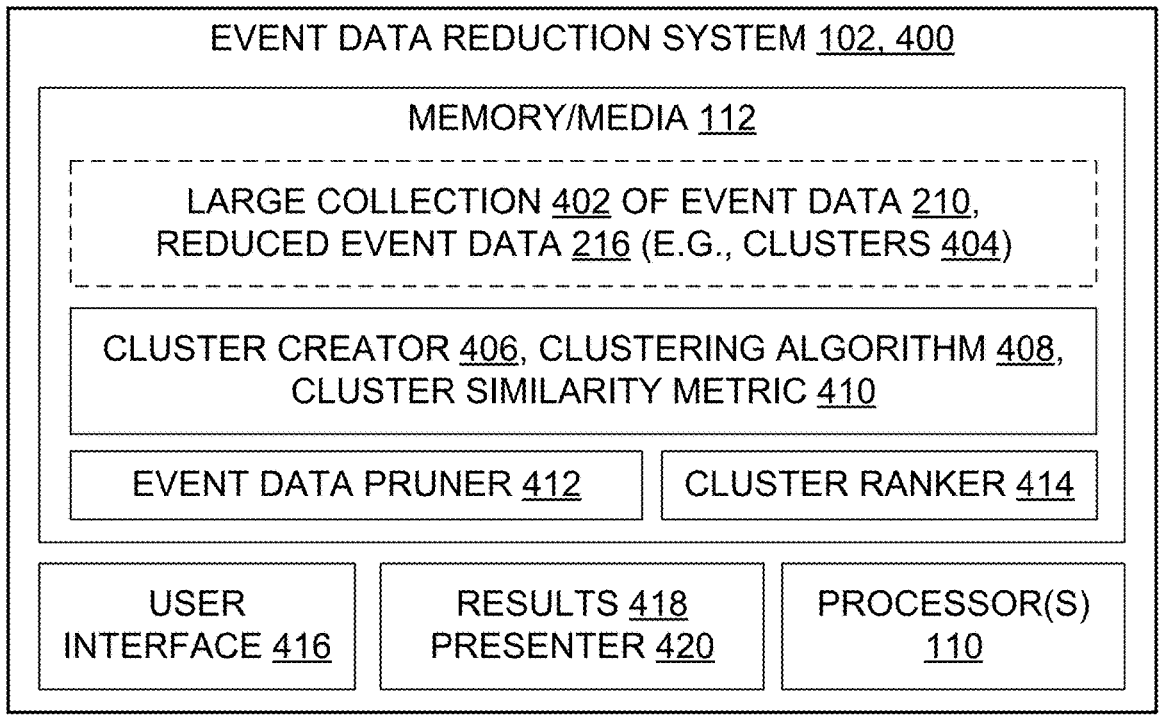
FIG. 4 is a block diagram illustrating aspects of a system which is configured for data reduction using pruning-and-prioritizing functionality.

FIG. 4 shows an example data reduction system 400. Incoming event data 210 is reduced by an event data pruner 412 from a large collection 402 to a reduced form 216. The reduced form may include clusters 404 which have selected event data or otherwise processed event data associated with them. Clusters 404 are created by a cluster creator 406 using a clustering algorithm 408 and a cluster similarity metric 401. Clusters may be ranked by a cluster ranker 414, thereby prioritizing reduced data 216 for inspection by an analyst 104. The ranked clusters, their reduced data, and related data (such as results illustrated in FIG. 9 or regression analysis results) constitute results 418 of event data reduction and of the accompanying processing. These results 418 are presented to analysts in a user interface 416, by a results presenter 420 which configures the user interface to display the results and to allow navigation through the results, for example.

Figure 5:
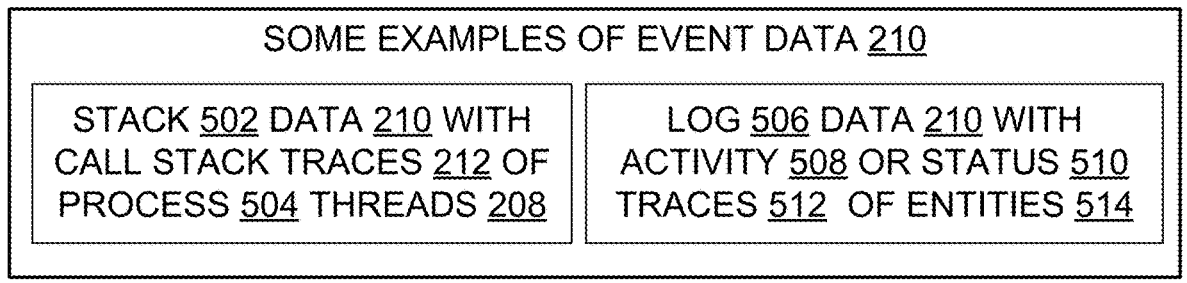
FIG. 5 is a block diagram illustrating some examples of event data.

Some examples of event data 210 are illustrated in FIG. 5. Examples shown include traces 212 of call stacks 502. Single-threaded programs may have call stack traces of interest to an analyst, but a motivating example for the present disclosure is stack traces 212 of threads 208 of a multi-threaded process 504. Also shown in FIG. 5 as an example is logged 506 event data 210 in the form of traces 512 pertaining to the activities 508 or status 510 of computing system entities 514. One of skill will acknowledge that other examples of event data are also susceptible to data reduction using tools and techniques taught herein.

Figure 6:
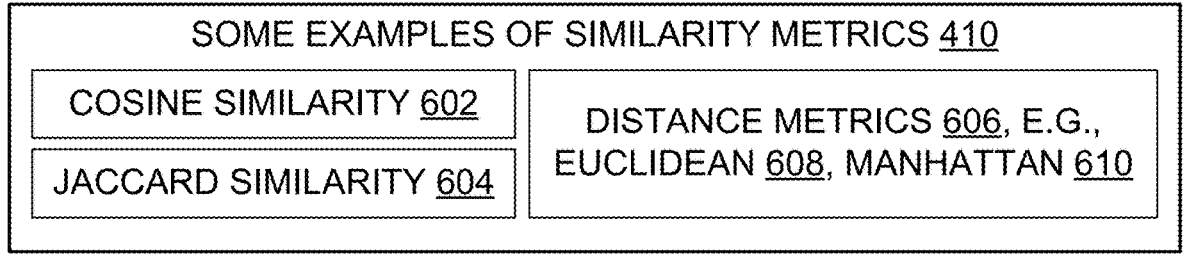
FIG. 6 is a block diagram illustrating some examples of similarity metrics.

Some examples of cluster creation similarity metrics 410 are illustrated in FIG. 6. Examples shown include code similarity 602, Jaccard similarity 604, and distance metrics 606. Illustrated examples of distance metrics include Euclidean distance 608 and Manhattan distance 610. One of skill will acknowledge that other similarity metrics may also be employed for cluster creation and data reduction as taught herein.

Figure 7:
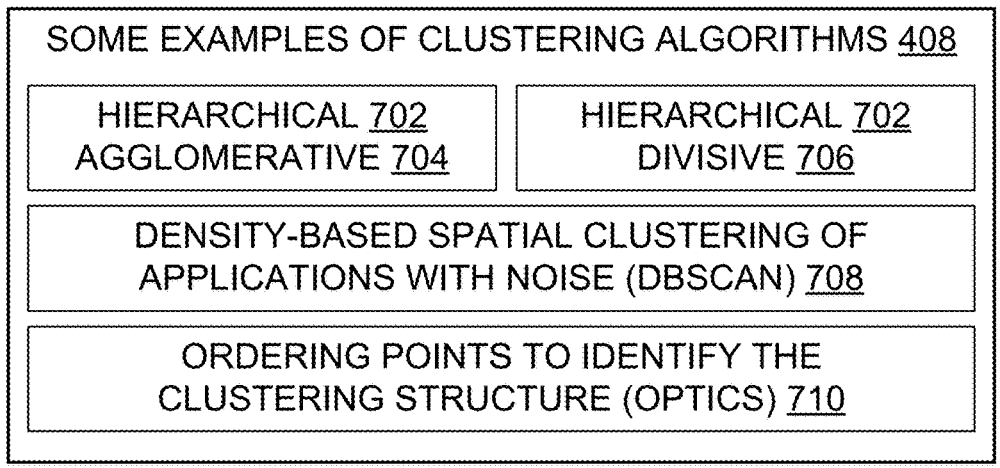
FIG. 7 is a block diagram illustrating some examples of clustering algorithms.

Some examples of clustering algorithms 408 are illustrated in FIG. 7. Examples shown include hierarchical agglomerative 704, hierarchical divisive 706, DBSCAN 708, and OPTICS 710. One of skill will acknowledge that other clustering algorithms may also be employed for cluster creation and data reduction as taught herein.

Figure 8:
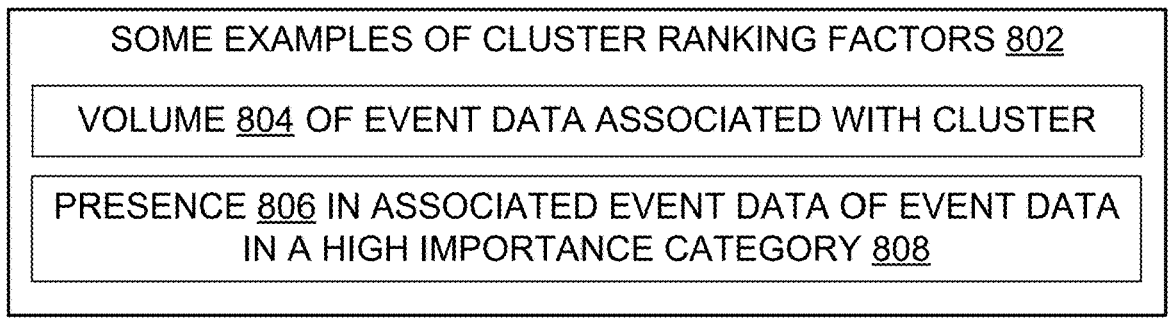
FIG. 8 is a block diagram illustrating some examples of cluster ranking factors.

Some examples of cluster ranking criteria 802 are illustrated in FIG. 8. One example shown is the volume 804 of data associated with a cluster. Thus, having more associated data can lead to a higher cluster ranking and thus to a higher priority for investigation of that associated data. Another example shown is the presence 806 of high importance data 808, e.g., call stack traces from user interface threads. Thus, other things being equal, a cluster with data 210 from a high-visibility or critical path thread 208 will have a higher ranking than a cluster that lacks such data 210.

Figure 9:
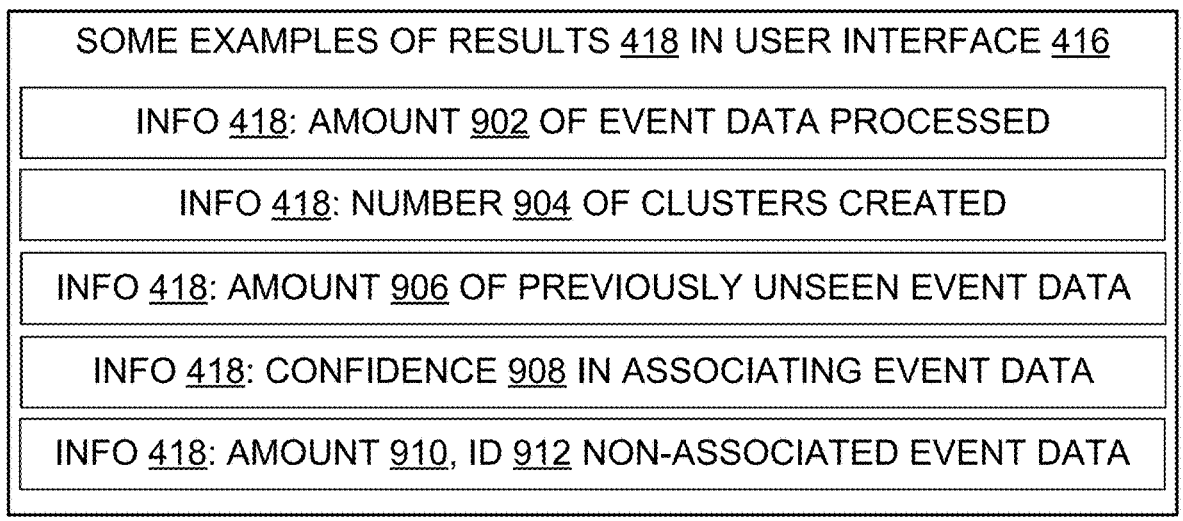
FIG. 9 is a block diagram illustrating some examples of results which are suitable to be presented in some user interfaces.

Some examples of data reduction results 418 suitable for presentation on a user interface 416 are illustrated in FIG. 9. Examples shown include the amount 902 of event data processed by data reduction tools and techniques, the number 904 of clusters 404 created from event data 210, the amount 906 of event data 210 processed that was "new" in the sense it was not identified by the system 400 as previously seen data, the level of confidence 908 in associating particular event data with a cluster (e.g., based on how similar the associated data items are to one another), and the amount 910 of event data 210 that is not being associated with an cluster, e.g., because it is not within a specified similarity tolerance of any cluster's data. One of skill will acknowledge that a user interface may also display other results 418 of data reduction as taught herein.

Figure 10:
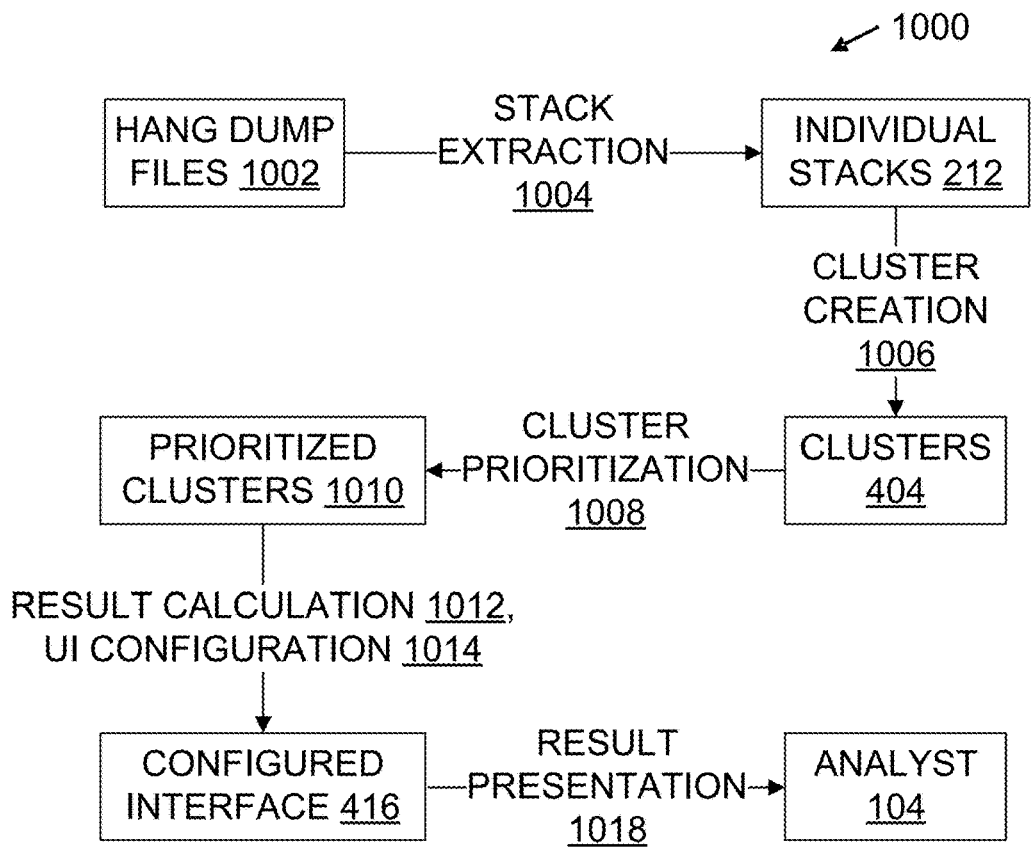
FIG. 10 is a data flow diagram illustrating some aspects of event data pre-processing, pruning, prioritization, and presentation.

FIG. 10 illustrates operation of some data reduction systems 400, or analysis systems 214 containing data reduction systems 400, through a data flow diagram 1000. This particular example includes extraction 1004 of event data 210 for individual stacks 502 from dump files 1002 which were created by a kernel 120 after a process 504 or program 206 of interest hangs. The data 210, 212 for individual stacks is gathered into clusters 404 through a cluster creation 1006 technique that uses hierarchical agglomerative clustering 704. The clusters 404 are then prioritized 1008 according to ranking criteria 802, thereby producing prioritized clusters 1010, 404. Sorting according to rank may be done on a weighted count (e.g., weighted by thread importance 808) rather than an absolute count based solely on data 216 volume 804. The cluster ranking (explicitly shown 1018, or implicit in a cluster presentation 1018 order), the reduced data 216 associated with the clusters, and other results 418 are calculated 1012. A user interface 416 is configured 1014 to display 1018 the results 418 to an analyst 104.

Figure 11:
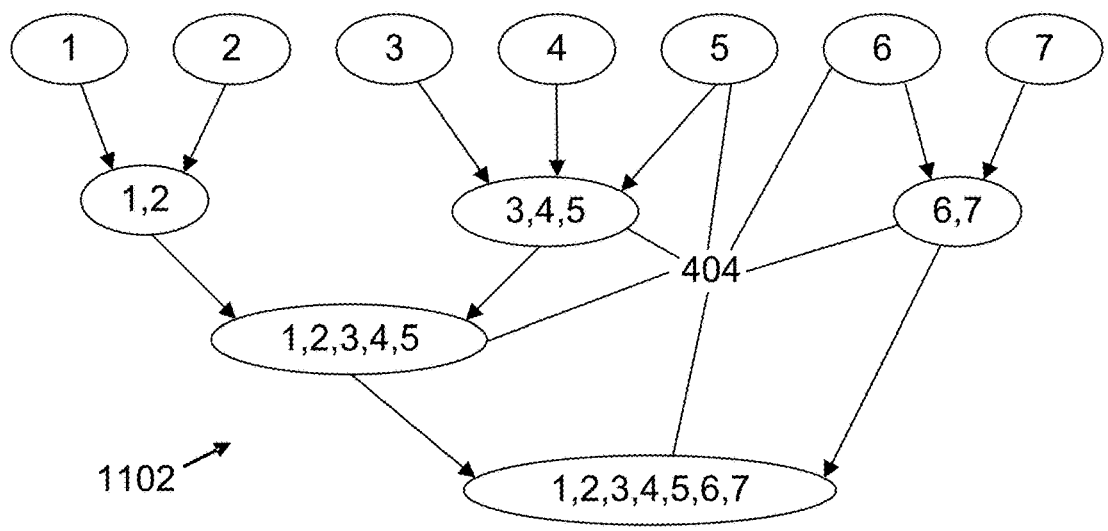
FIG. 11 is graph diagram illustrating a cluster dendogram.

FIG. 11 illustrates a dendogram 1102 which could be created through hierarchical agglomerative clustering 704. The individual integers 1 through 7 represent individual pieces of data which can be associated with clusters, e.g., vectorized stack traces or other vectors, while curly braces { } are used to indicate such association. Thus, {1,2} indicates a cluster which has data items 1 and 2 associated with it.

In FIG. 11, at a first level of clustering, clusters {1} and {2} are joined to form a cluster {1,2}, clusters {3}, {4}, and {5} are joined to form a cluster {3,4,5}, and clusters {6} and {7} are joined to form a cluster {6,7}. At a second level of clustering, clusters {1,2} and {3,4,5} are joined to form a cluster {1,2,3,4,5}. At a third level of clustering, clusters {1,2,3,4,5} and {6,7} are joined to form a cluster {1,2,3,4,5,6,7}. Since there is now only a single cluster, and all data items of interest have been associated with some cluster, the hierarchical agglomerative clustering is done, at least so far as producing clusters 404 is concerned.

A next operation would be to select clusters for ranking 1008 and subsequent presentation 1018. This selection could be done, e.g., by specifying a level of clustering. For example, if the first level of clustering is selected, then the clusters to be ranked and presented would be {1,2}, {3,4,5} and {6,7}. An embodiment may combine selection through a particular clustering level with other criteria, or may use other selection criteria without regard to clustering level. For instance, the smallest clusters having at least N associated data items could be selected as part of cluster creation 1006, or the M largest clusters could be selected, or the level could be counted back from the large single cluster eventually produced by joining smaller clusters. Counting back one level from the large single cluster of the FIG. 11 example, for instance, would select {1,2,3,4,5} and {6,7} as the clusters to be ranked and presented.

Some embodiments use or provide a system 400 configured with prune-and-prioritize functionality 412, 414 to assist analysis of event data 210 which relates to a circumstance 218 that is under investigation by an analyst 104. The circumstance 218 under investigation could be a hang 1338, a crash 1340, 1342, or any other circumstance that has event data 210 associated with it. In this example, the system 400 includes a digital memory 112, a digital processor 110 in operable communication with the memory, an event data pruner 412, a similarity metric 410, a cluster creator 406, a cluster ranker 414, a user interface 416, and a results presenter 420.

In this example, the event data pruner 412 upon execution by the processor prunes event data 402, 210 which resides at least partially in the memory 112, thereby condensing event data or excluding event data or doing both.

In this example, the similarity metric 410 upon execution by the processor quantifies similarity of two or more clusters 404, which may be done, e.g., directly by comparing the clusters or indirectly by comparing some or all of the reduced event data that is associated with the clusters. The cluster creator 406 upon execution by the processor creates clusters 404 based on pruned event data 216, 210. The cluster creator 406 is configured to create clusters according to a clustering algorithm 408 by using the similarity metric 410.

In this example, the cluster creator 406 is configured to create clusters using, e.g., a hierarchical clustering algorithm, without requiring a prior specification of the number of clusters to create. This approach is in contrast, e.g., to approaches that use a k-means or k-medoids clustering algorithm which sets a target number k specifying the number of clusters to create.

In this example, the cluster ranker 414 upon execution by the processor ranks clusters according to one or more factors 802, thereby prioritizing event data of clusters for inspection.

In this example, the results presenter 420 upon execution by the processor configures the user interface 416 to present results 418 which may include at least a portion of the pruned event data 216 of at least some clusters according to their cluster ranks. Accordingly, this system 400 assists analysis and prioritized inspection of event data 210 by the analyst 104, by surfacing organized event data 216, 418 that is relevant to the circumstance 218 or by supporting comparison of clusters 404 from before and after a change in the circumstance 218, or both.

In some embodiments, the event data 210 that gets pruned and clustered can be call stack traces or log data, for example. In some, the event data 210 configures at least a portion of the digital memory 112, and the event data 210 includes at least one of the following: stack 502 data 210 containing call stack traces 2121 of threads 208 of a computational process 504, or log 506 data 210 containing activity 508 traces 512 of entities 514 of a monitored environment 202 or status 510 traces 512 of entities 514 of the monitored environment 202.

In some embodiments, the cluster creator 406 is configured to create clusters 404 according to at least one of the following similarity metrics: a cosine similarity metric 602, or a Jaccard similarity metric 604. More generally, the similarity metric 410 can be any suitable metric for the type of event data 210 under analysis. Suitability of a metric 410 is determined by developers 104 or analysts 104 or both, based on criteria such as: computational requirements for calculating quantifications under the metric in question, and whether the clusters created using the metric 410 in question are considered helpful in investigating the circumstance 218 in question using the event data 210 in question.

In some embodiments, the cluster creator 406 is configured to create clusters 404 using a hierarchical agglomerative clustering algorithm 704. More generally, the cluster creator 406 can use any suitable clustering algorithm, e.g., DBSCAN 708 or OPTICS 710 or hierarchical divisive clustering 706. Suitability of a clustering algorithm 408 is determined by developers 104 or analysts 104 or both, based on criteria such as: computational requirements for creating clusters 404 with the clustering algorithm 408 in question, and whether the clusters created using the clustering algorithm 408 in question are considered helpful in investigating the circumstance 218 in question using the event data 210 in question.

In some embodiments, the cluster ranker 414 is configured to rank clusters according to one or more of the following factors 802: an event data volume 804 which is associated with a cluster, or a presence 806 in event data associated with a cluster 404 of event data which belongs to one or more event data categories 808 which are specified as having high importance. In some embodiments, user interface thread call stack traces are an example of event data which belongs to one or more event data categories which are specified as having high importance 808. In some embodiments, traces of critical threads in real time systems are high importance data 808; critical threads have high importance because if they hang or crash then the real time system will not meet its performance requirements.

In some embodiments, the event data 210 includes stack data containing call stack traces 212 of at least thirty threads 208 of a computational process. In some, it consists substantially of stack trace data 212. In some, the program under investigation has at least fifty threads 208, and the event data 210 includes corresponding stack traces 212. In some environments 202, a given hang dump 1002 generally contains from about thirty to about five hundred threads. However, many of the threads are often identical when the number of threads is toward the larger value.

In some embodiments, the user interface 416 includes at least one (or alternately at least two, or at least three, or at least four) of the following when the user interface has been configured by the results presenter 420: statistical information 418 indicating an amount 902 of event data processed by the system, statistical information 418 indicating a number 904 of clusters created by the system, regression information 418 indicating an amount 906 of previously unseen event data, confidence information 418 indicating a level 908 of confidence for an association of event data with a cluster, or unclustered data information 418 identifying event data which the cluster creator did not associate with any cluster.

Figure 14:
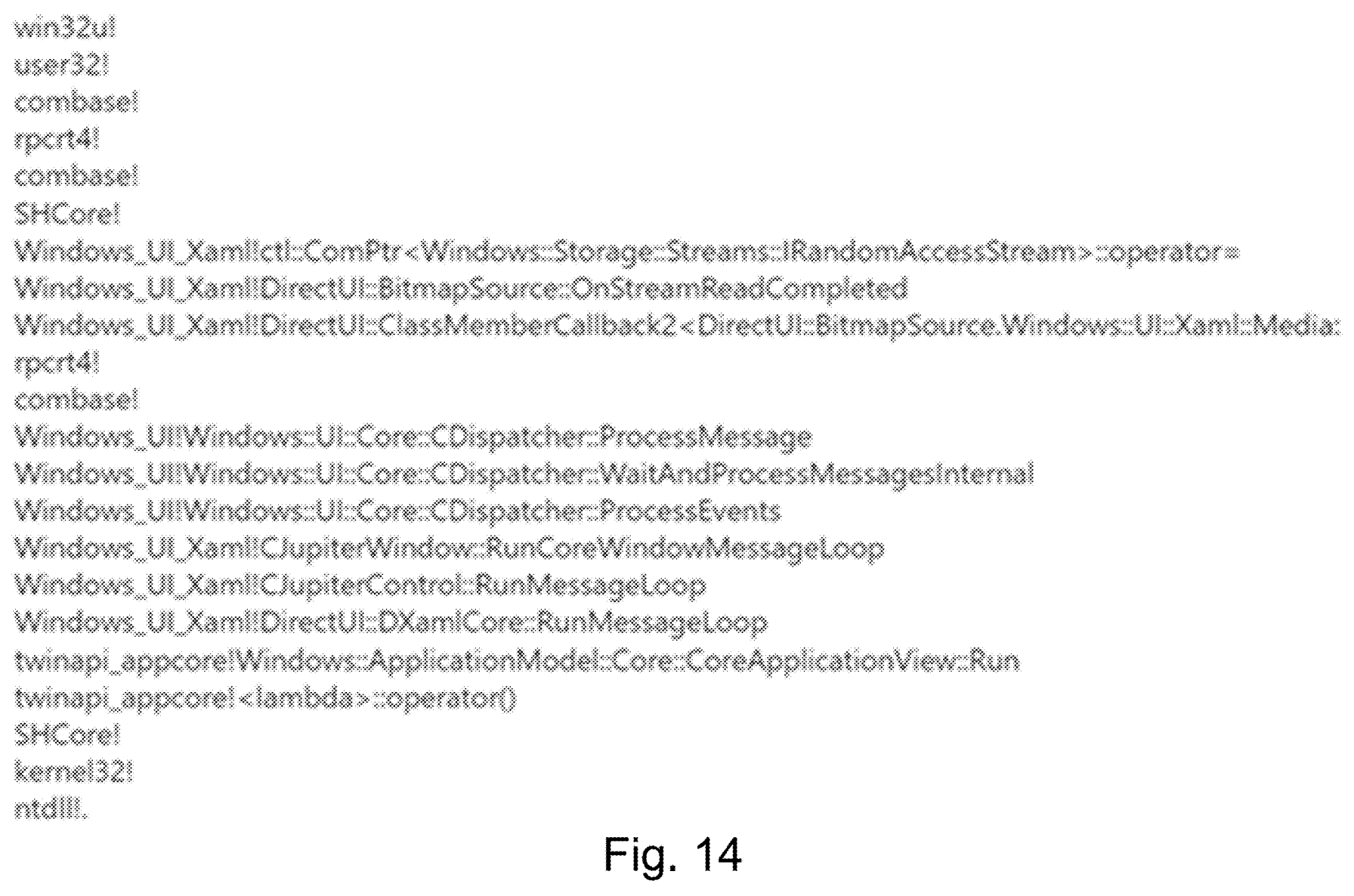

In one implementation, a configured user interface 416 displays a Microsoft PowerBI® (mark of Microsoft Corporation) report showing input data statistics 902 (number of hang dump files, number of stacks), clustering statistics 904 (number of clusters) and 910 (number of non-clustered stacks), a confidence 908 in clustering statistics reflecting a similarity threshold, a regression analysis 906 annotated Venn diagram across three program builds showing cluster counts for overlaps across the builds, a histogram 418 showing stacks processed according to stack build number or processor architecture, a pie chart 418 showing stacks by hang type (activation, navigation quiesce), search input boxes to allow searching frames across cluster representative stacks or across clusters of stacks, cluster representatives sorted by weight (i.e., prioritized by rank) and showing respective weight and cluster size 804 and reduced data 216 (non-excluded stack frames or condensations thereof; FIG. 14 shows an example), and stacks per cluster sorted by the confidence 908 in their belonging to the cluster and showing respective build number and processor architecture ID and confidence value (in range 0 to 1.00) and text 216 (non-excluded stack frames or condensations thereof; FIG. 14 shows an example). As used herein, "build" means a program (executable digital artifact) which is produced from one or more components or constituent pieces such as source code files, object code files, resource files, configuration files, command line arguments, or other digital items, through operations such as one or more of compilation, interpretation, code generation, translation, decryption/encryption, decompression/compression, parsing, concatenation, encoding/decoding, linking, or other software development operations, under the direction or control or guidance of a makefile, project file, or other software construction tool. Other implementations may include some additional results 418, may exclude of these examples of results 418, or do both. Also, presenters 420 are not limited to those which include or communicate with Microsoft PowerBI® (mark of Microsoft Corporation) reporting tools.

Other system embodiments are also described herein, either directly or derivable as system versions of described processes or configured media, informed by the extensive discussion herein of computing hardware.

Although specific architectural examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided herein to help illustrate aspects of the technology, but the examples given within this document do not describe all of the possible embodiments. Embodiments are not limited to the specific data, thresholds, data types, configurations, implementations, arrangements, displays, features, approaches, or scenarios provided herein. A given embodiment may include additional or different technical features, mechanisms, sequences, data structures, or functionalities for instance, and may otherwise depart from the examples provided herein.

Processes (a.k.a. Methods)

Figure 12:
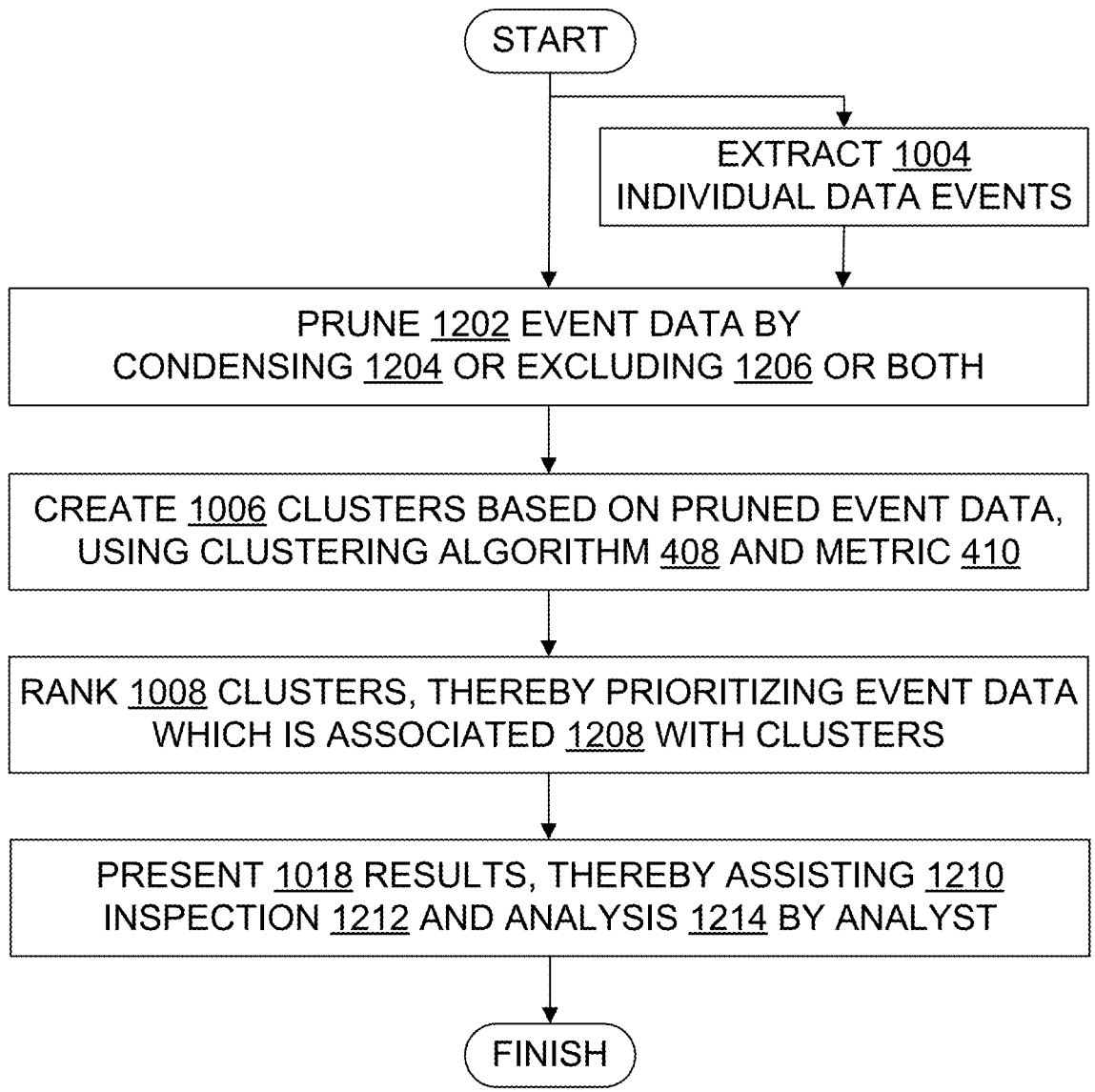
FIG. 12 is a flowchart illustrating steps in some event data reduction methods.

FIG. 12 illustrates a method 1200 which is an example of methods that may be performed or assisted by a data reduction system 400. Individual data events, possibly in groups such as stack traces, are extracted 1004 from larger collections of data, such as crash or hang dump files 1002, e.g., by familiar parsing and copying tools and techniques. Extracted or otherwise obtained event data 402, 210 is pruned 1202 by condensing 1204 data or excluding 1206 data, or by doing both. For example, stack traces may be pruned 1202 by condensing 1204 a stack frame, from a full name that includes the module name and intermediate API names or other module names as well as the local name of the routine actually called, down to only the module name. Also, stack traces may be pruned 1202 by excluding 1206 entire stack frames from a stack trace, e.g., by excluding stack frames from the interior of the trace. Other condensing 1204 or excluding 1026 operations may also, or alternately, be part of pruning 1202.

Continuing through the flowchart of FIG. 12, clusters are created 1006 based on the pruned event data. Cluster creation is accomplished using one or more clustering algorithms 408 and one or more similarity metrics 410, as discussed elsewhere herein. Clusters are ranked 1008, thereby prioritizing for analyst review the pruned event data that is associated 1208 with the respective ranked clusters. Pruning and prioritizing results 418 are presented 1018, thereby assisting 1210 an analyst in the inspection 1212 of event data and in the analysis 1214 of potential causes or apparent impacts of the circumstance 218 that is under investigation. In some embodiments, call stacks which are similar-but-not-identical cluster together, improving analysis speed and accuracy of prioritization.

Figure 13:
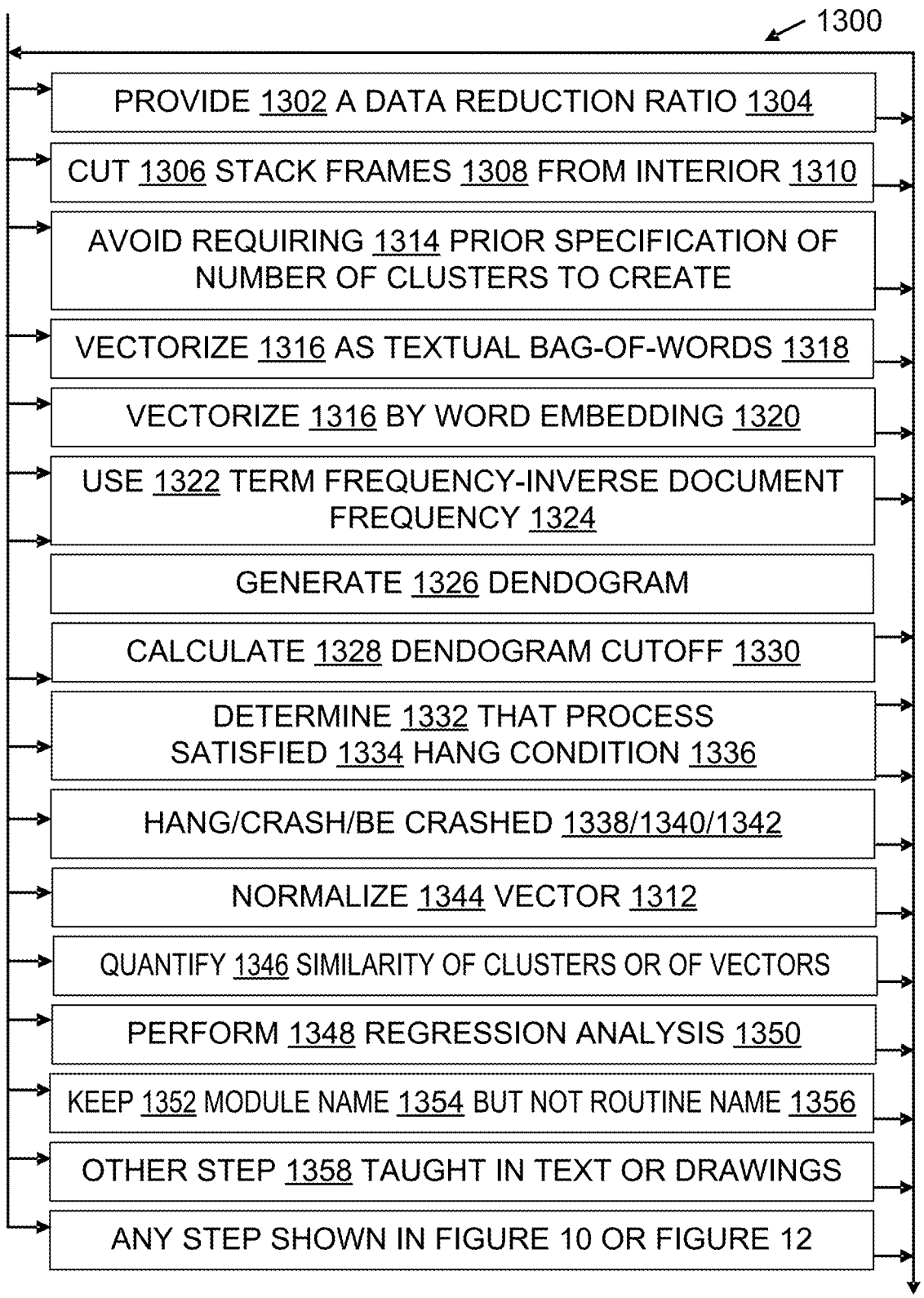
FIG. 13 is a flowchart further illustrating steps in some event data reduction methods.

FIG. 13 further illustrates data reduction methods, including refinements, supplements, or contextual actions for steps shown in FIG. 12. Technical processes shown in the Figures or otherwise disclosed will be performed automatically, e.g., by data reduction system 400, unless otherwise indicated. Processes may also be performed in part automatically and in part manually to the extent action by a human administrator or other human person is implicated, e.g., in some embodiments a person may set confidence level 908 thresholds that determine whether data 216 gets associated 1208 with a cluster. No process contemplated as innovative herein is entirely manual. In a given embodiment zero or more illustrated steps of a process may be repeated, perhaps with different parameters or data to operate on. Steps in an embodiment may also be done in a different order than the top-to-bottom order that is laid out in FIGS. 10, 12, and 13. Steps may be performed serially, in a partially overlapping manner, or fully in parallel. In particular, the order in which flowchart 1200 action items or flowchart 1300 action items are traversed to indicate the steps performed during a process may vary from one performance of the process to another performance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim.

Some embodiments use or provide a data reduction prune-and-prioritize method for assisting analysis of event data 210 which relates to a circumstance that is under investigation by an analyst, the method including: pruning 1202 the event data by condensing 1204 at least some of the event data or by excluding 1206 at least some of the event data or by doing both; automatically creating 1006 clusters 404 based on pruned event data, the clusters being created according to a similarity metric 410 by using a clustering algorithm 408 without requiring 1314 a prior specification of the number of clusters to create; ranking 1008 at least some of the clusters according to one or more factors 802, thereby prioritizing event data of clusters for inspection; and presenting 1018 through a user interface at least a portion of the pruned event data of at least some clusters according to their cluster ranks. This method assists 1210 analysis by surfacing organized event data that is relevant to the circumstance, thus allowing prioritized inspection 1212 of event data by the analyst.

In some embodiments, pruning the event data includes at least one of the following: condensing 1204 a call stack frame 1308 which includes a module name 1354 and one or more routine names 1356, by excluding 1206 the routine names and keeping 1352 the module name; condensing 1204 multiple adjacent call stack frames 1308, which each include the same module name 1354, into a single call stack frame which includes that module name. By way of illustration, the following example (a) illustrates collapsing 1204 platform module stack frames into only the module name, and the following example (b) illustrates collapsing identical adjacent module names into a single instance:

(a) turn
user32!RealMsgWaitForMultipleObjectsEx
into
user32!
(b) turn
user32!
user32!
into
user32!

FIG. 14 shows additional examples similar to example (a) in which only a module name 1354 portion of a stack frame is kept 1352 after the frame is collapsed 1204 during pruning.

A different kind of pruning 1202 is to keep the beginning and the end of the stack trace, but cut 1206, 1306 some frames from the middle. That is, in some embodiments, pruning 1202 the event data includes excluding 1206, 1306 one or more call stack frames 1308 from an interior portion 1310 of a call stack trace 212. This may involve keeping at least B beginning frames, keeping at least E ending frames, keeping at most T frames total, or a combination thereof. Suitable values B, E, T may be set by default or specified by a developer or an analyst or both, based on criteria such as computational requirements pruning 1202 under the values in question, and whether the results 418 created using the values in question are considered helpful in investigating the circumstance 218 in question using the event data 210 in question. This may also be referred to as keeping the top X frames and the bottom Y frames. It is done in some embodiments after collapsing frames to keep 1352 only the module names.

To clarify terminology, the "top" X frames are the newest frames, and the "bottom" frames are the oldest frames. The topmost stack frame is what the CPU was actually executing at the time when the dump file was written. The bottom frame is the first frame one from when the process or thread started.

As an example XAML code frequently has extremely tall call stacks (100-200 frames tall) with most of the middle of the stack being highly repeated uninteresting stuff, from the perspective of hang analysis. The middle doesn't matter as much as the bottom (where the thread started) and the top (where the thread ended up). Accordingly, cutting 1306 frames from the interior can improve analyst productivity and reduce the computational and storage requirements for an analysis system 214, 400.

In some embodiments, automatically creating 1006 clusters based on pruned event data includes at least one of the following: vectorizing 1316 a call stack trace, which may include forming a textual bag-of-words 1318, or word embedding 1320, or both; normalizing 1344 a vector based on term frequency-inverse document frequency; or quantifying 1346 similarity of two or more vectors using a similarity metric 410.

In some embodiments, automatically creating 1006 clusters based on pruned event data includes generating 1326 a dendrogram 1102 using a hierarchical clustering algorithm 702. This method also includes dynamically calculating 1328 a dendrogram cutoff 1330 which delimits a set of clusters 404 to be ranked 1008. In one implementation the dendrogram cutoff 1330 calculation 1328 is a refinement of the hierarchical agglomerative clustering algorithm 702, 704, and is implemented using a commercially available R programming environment project DynamicTreeCut package.

In some embodiments, the method includes obtaining for pruning event data 210 which includes multiple call stack traces 212 of respective threads 208 of a process after a determination 1332 has been made that the process satisfied 1334 a hang condition 1336. In some embodiments, the method includes obtaining for pruning event data 210 which includes multiple call stack traces 212 of respective user interface threads 208 of a process. In the investigation of some circumstances 218, it does not matter whether the user interface threads or other threads under investigation hung 1338, or crashed 1340 on their own, or were forcibly crashed 1342 by a developer.

In some embodiments, the event data 210 includes call stack traces 212, and the pruning 1202 provides 1302 a data reduction ratio 1304 of at least forty to one, where this data reduction ratio is calculated as the number of call stack traces relative to the number of clusters. In some, this data reduction ratio 1304 of call stacks to clusters is at least thirty to one, or at least twenty to one, or at least ten to one, or at least fifty to one. For example, in one internal exercise, approximately 26,000 stacks were pruned and used in creation of 607 clusters, providing a data reduction ratio 1304 of over forty to one. In other embodiments, different statistics may be used as a measure of data reduction, e.g., storage size of the call stack traces 402 relative to storage size of the pruned and prioritized cluster-associated data 216, or ratios calculated statistics on other items noted herein such as number or size of dump files, number of stack frames collapsed or entirely excluded or both, and so on. One of skill will recognize that the pruning 1202 of event data, and the prioritization 1008 of pruned data, each has real world benefits for analysts such as removing marginally relevant or extraneous data 210 the analyst would otherwise need to peruse. The fact that the data reduction benefits can be measured in various ways does not prevent recognition of their advantages.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as an event data pruner 412, cluster ranker 414, clusters 404 with associated data 210, dendograms 1102, similarity metrics 410 and clustering algorithms 408, and pruned data 216, in the form of data 118 and instructions 116, read from a removable storage medium 114 and/or another source such as a network connection, to form a configured storage medium. The configured storage medium 112 is capable of causing a computer system 400 to perform technical process steps for data reduction, as disclosed herein. The Figures thus help illustrate configured storage media embodiments and process (a.k.a. method) embodiments, as well as system and process embodiments. In particular, any of the process steps illustrated in FIG. 10, 12 or 13, or otherwise taught herein, may be used to help configure a storage medium to form a configured storage medium embodiment.

Some embodiments use or provide a computer-readable storage medium 112, 114 configured with data 118 and instructions 116 which upon execution perform a prune-and-prioritize method for assisting analysis of a large collection 402 of event data which relates to a circumstance 218 that is under investigation by an analyst. This method includes:

pruning 1202 the large collection of event data down to a small collection 216 of event data by condensing 1204 at least some of the event data or by excluding 1206 at least some of the event data or by doing both; vectorizing 1316 at least a portion of the pruned event data, thereby producing vectors 1312; automatically creating 1006 clusters based on at least some of the vectors, the clusters being created according to a similarity metric 410 by using a clustering algorithm 408 without requiring 1314 a prior specification of the number of clusters to create; ranking 1008 at least some of the clusters according to one or more factors 802, thereby prioritizing event data of vectors of clusters for inspection; and presenting 1018 through a user interface at least a portion of the pruned event data of at least some vectors of at least some clusters according to their cluster ranks. This method assists 1210 analysis by surfacing organized event data that is relevant to the circumstance, thus allowing prioritized inspection 1212 of event data by the analyst.

In some embodiments, a process 504 which hung had multiple threads 208, the event data 210 relates to an investigation into why the process hung, and the event data includes call stack traces 212 of at least ninety percent of the threads of the process. This is considered herein "substantially all" of the threads of the process. To analyze a hang, it is sometimes necessary to process substantially all of the threads of the process that hung, unlike analysis of a crash which may often be fruitful without involving substantially all of the threads of the process that crashed. However, teachings herein are not limited to hang analysis; they may also be applied to crash investigations, for example. In particular, when something timed out or a developer decided responsiveness was inadequate, and as a consequence the program was forcibly crashed 1342, the resulting circumstances are sometimes similar to a hang 1338.

An analyst may wish to investigate the possibility that a current build of a program 206 generated lots of problematic stacks 502 that are not found in prior builds. In some embodiments, a build which executed had multiple threads 208 with corresponding call stack traces 212, the event data 210 relates to an investigation into execution of the build, and the method further includes performing 1348 a regression analysis 1350 which indicates an amount 906 of call stack traces generated by execution of the build that were not generated by execution of at least one different build.

Pruning may be used to remove routines that are not specific to a target app 124 being debugged, as illustrated in FIG. 14. In some embodiments the event data 210 includes call stack traces 212 of threads 208 of a target application program 124, 206, and pruning 1202 includes condensing 1204 a call stack frame 1308 which includes a module name (e.g., "win32", "combase", "rpert4", "combase", "Windows_UI", "twinapi_appcore", "SHCore", or "ntdll" in FIG. 14) and also includes one or more routine names (not shown in collapsed frames in FIG. 14 due to exclusion 1206) of routines which are not specific to the target application program, by excluding 1206 those routine names 1356 and keeping the module name 1354.

An analyst may wish to investigate the possibility that a hang is caused by platform code which supports multiple applications 124. Thus, the analyst may wish to look for stacks which are common to (i.e., shared by) two or more apps, when investigating a hang 1338. In some embodiments, the event data 210 includes call stack traces 212 of threads 208 of at least two different target application programs 206 whose respective executions each include calls to routines of a single underlying platform, and creating 1006 clusters includes associating 1208 pruned event data 216 (which is from executions of different target application programs) with the same cluster 404.

Additional Examples and Observations

One of skill will recognize that not every part of this disclosure, or any particular details therein, are necessarily required to satisfy legal criteria such as enablement, written description, or best mode. Also, embodiments are not limited to the particular parameters, threshold values, range endpoints, networks, tools, identifiers, fields, data structures, functions, constants, or other implementation choices described herein. Any apparent conflict with any other patent disclosure, even from the owner of the present innovations, has no role in interpreting the claims presented in this patent disclosure. With this understanding, which pertains to all parts of the present disclosure, some additional examples and observations are offered.

Some embodiments provide functionality for stack de-duping (i.e., duplication removal) to analyze process hangs. Such functionality may reduce the mean time spent prioritizing stacks for hang analysis from days to hours, perhaps less in some cases. It can enhance developer productivity by a carefully tailored use of unsupervised machine learning technology.

For some analysts, analyzing stacks for a process crash often includes a well-defined methodology of scrutinizing stacks to identify the single thread that crashed the process 504. Using a stack hash enables grouping of similar stacks across crashes. This approach, however, does not work well for process hang analysis. In a process hang, all or substantially all threads in the process generally must be analyzed. Any excluded threads may have been a cause of the hang. When an investigation involves hundreds of thousands of hangs across many machines, there are likely thousands of files 1002 with hundreds of thousands of stacks 502 across those files, which poses a big data problem for the developer or other analyst.

Some embodiments perform feature engineering on raw stacks, which allows the use of unsupervised machine learning algorithms (e.g., text clustering) to create clusters 404 of similar stacks. Some implement collapsed frames 1308. The count of standard frames like ntdll, corn, rpc in a given program tends to be high relative to the count of app-specific frames. If standard frames are not removed or at least reduced, they may govern which clusters are formed rather than creating clusters based largely or entirely on app-specific frames (which are more likely to be helpful in analyzing problems with an app). Some embodiments keep the top X and bottom Y frames rather than keeping all frames in a stack, because although a hang can happen for scenarios having various starting points they sometimes end the same way. Some embodiments convert collapsed stack frames to a text paragraph. The ordering of frames within a stack is important for debugging the root cause of a crash or hang, but that ordering is less important, or not important (depending on the embodiment) for stack similarity purposes. Therefore, some embodiments treat a stack like a text paragraph where each frame is a word, and use bag-of-words 1318 techniques for generating features for similarity 410 purposes.

A hang occurs when code stops making progress. There are many different reasons for hangs. Not all hangs are caused by deadlocks. Detecting a hang is a form of the halting problem, so timers are often used to make hang detection computationally feasible. An independent component watches the responsiveness of an app, and if the app stops responding a hang is declared. For some apps, a platform (e.g., kernel or runtime) provides this hang detection service. Typically only user interface threads are watched for hangs, because those are what the user interacts with.

Some computing environments, such as those using the Universal Windows Platform™ (UWP™) (marks of Microsoft Corporation), may distinguish different categories of hang. UWP hangs 1338 may include Activation hangs, which occur when an app is launching or resuming. The timeout that expires before "app hung" status is assigned varies between 15-120 seconds for some implementations. UWP hangs may also include Quiesce hangs, which occur when an app is suspending. The timeout for some implementations is 5 seconds (resource-aware). UWP hangs may also include Navigation hangs, in which ViewManager state transitions didn't occur quickly enough. Sometime these are "bucketed" (i.e., categorized) as activation hangs.

As a further illustration of stacks that may be analyzed in a system 214, one example idle user interface thread includes the following:
win32u!ZwUserMsgWaitForMultipleObjectsEx
user32!RealMsgWaitForMultipleObjectsEx
combase!ASTAWaitContext::KernelWait
combase!ASTAWaitContext::Wait
combase!CoMsgWaitInProcessEvents
Windows_UI!Windows::UI::Core::CDispatcher:WaitAndProcessMessagesInternal
Windows_UI!Windows::UI::Core::CDispatcher:ProcessEvents
Windows_UI_Xaml!CJupiterWindow::RunCoreWindowMessageLoop
Windows_UI_Xaml!CJupiterControl::RunMessageLoop
Windows_UI_Xaml!DirectUI::DXamlCore::RunMessageLoop
twinapi_appcore!Windows::ApplicationModel::Core::CoreApplicationView::Run
twinapi_appcore!<lambda_476a253d60a149be58fa202b-506b2c7b>::operator( )
shcore!_WrapperThreadProc
KERNEL32!BaseThreadInitThunk
ntdll!RtlUserThreadStart One example of a pruned 1202 thread trace 212 which is waiting to suspend includes the following:
win32u!
user32!
combase!
twinapi_appcore!Windows::ApplicationModel::Core::CoreApplicationView::SuspendResume
twinapi_appcore!Windows::ApplicationModel::Core::CoreApplicationView::SuspendResumeHandler:Invoke
Windows_UI!Windows::UI::Core::CDispatcher:ProcessInvokeItem
Windows_UI!Windows::UI::Core::CDispatcher:ProcessMessage
Windows_UI!Windows::UI::Core::CDispatcher:WaitAndProcessMessagesInternal
Windows_UI!Windows::UI::Core::CDispatcher:ProcessEvents
Windows_UI_Xaml!CJupiterWindow::RunCoreWindowMessageLoop
Windows_UI_Xaml!DirectUI::DXamlCore::RunMessageLoop
twinapi_appcore!Windows::ApplicationModel::Core::CoreApplicationView::Run
twinapi_appcore!<lambda>::operator
SHCore!
kernel32!
ntdll!.

One example of thread data 210 involving a lock is the following:
ntdll!ZwWaitForAlertByThreadId
ntdll!RtlpWaitOnAddressWithTimeout
ntdll!RtlpWaitOnAddress
ntdll!RtlpWaitOnCriticalSection
ntdll!RtlpEnterCriticalSectionContended
ntdll!RtlEnterCriticalSection
Windows_UI_Xaml!CD3D11DeviceInstance::IsHdrOutput
Windows_UI_Xaml!CD3D11Device::IsHdrOutput
Windows_UI_Xaml!CJupiterControl::UpdateHdr
Windows_UI_Xaml!CJupiterControl::HandleWindowMessage
Windows_UI_Xaml!CJupiterWindow::CoreWindowSubclassProc
Windows_UI_Xaml!CJupiterWindow::StaticCoreWindowSubclassProc
user32!UserCallWinProcCheckWow
user32!DispatchClientMessage
user32!_fnDWORD
ntdll!KiUserCallbackDispatcherContinue
win32u!ZwUserRedrawWindow
Windows_UI_Xaml!CJupiterWindow::ShowWindow
Windows_UI_Xaml!CJupiterControl::SetWindow
Windows_UI_Xaml!CJupiterControl::ConfigureCoreWindow
Windows_UI_Xaml!DirectULDXamlCore::ConfigureCoreWindow
Windows_UI_Xaml!DirectUI::FrameworkView::SetWindow
twinapi_appcore!Windows::ApplicationModel::Core::CoreApplicationView::SetWindowAndGetDispatcher
(Lots more stack . . . )
(On another thread the ATI graphics driver is holding the lock)

One example of pruned 1202, 1352 thread data 210 involving a remote procedure call (RPC) is the following:
win32u!
user32!
combase!
rpcrt4!
combase!
twinapi_appcore!CShellExperience::_GetBrokerWorker<IImmersiveShellBroker,I ShellExperienceBroker>
twinapi_appcore!CShellExperience::_GetShellExperienceBroker
twinapi_appcore!CShellExperience::SetExperienceId
ShellExperienceHost!ShellExperienceHost::App::Initialize
ShellExperienceHost!ShellExperienceHost::App::[Windows::UI::Xaml::|ApplicationOverrides]::OnLaunched
ShellExperienceHost!ShellExperienceHost::App::[Windows::UI::Xaml::|ApplicationOverrides]::_abi_Windows_UI_Xaml_|ApplicationOverrides_abi_OnLaunched
Windows_UI_Xaml!DirectUI::FrameworkApplicationGenerated::OnLaunchedProtected
Windows_UI_Xaml!DirectUI::FrameworkView::OnActivated
Windows_UI_Xaml!Microsoft::WRL:Details::DelegateArgTraits<long (_cdecl Windows::Foundation::ITypedEventHandler_impl<Windows::Foundation::Internal::AggregateType<Windows::UI::Core::CoreWindow* _ptr64,Windows::UI::Core::ICoreWindow*

_ptr64>,Windows::Foundation::Internal::AggregateType<Windows::UI::Core::CharacterReceivedEventArgs*_ptr64,Windows::UI::Core::ICharacterReceivedEventArgs*_ptr64>>::*)  twinapi_appcore!Microsoft::WRL:InvokeTraits←2>::InvokeDelegates<<lambda_23a337b44e6947c065fdd56d785f41f3>,Windows::Foundation::ITypedEventHandler<Windows::ApplicationModel::Core::CoreApplicationView*_ptr64,Windows::ApplicationModel::Activation::IActivatedEventArgs*_ptr64> twinapi_appcore!Windows::ApplicationModel::Core::CoreApplicationView::Activate rpert4!

combase!

rpert4!

combase!

Windows_UI!Windows::UI::Core::CDispatcher:ProcessMessage

Windows_UI!Windows::UI::Core::CDispatcher:WaitAndProcessMessagesInternal

Windows_UI!Windows::UI::Core::CDispatcher:WaitAndProcessMessages twinapi_appcore!<lambdaa_02cef69f8ae13d771fa47a74-be974b8f>::operator SHCore!

kernel32!

ntdll!

As another illustration of data reduction, in one exercise applying teachings provided herein, approximately 1300 dump files were processed into about 8000 stack traces, which were then reduced to 256 clusters 404. As another example, the pruned stack trace in FIG. 14, which is 22 frames (or partial frames in the form of module names only) tall was originally 86 frames tall.

In some multiphase embodiments, a Data Ingestion phase includes deciding how many hang files across how many builds to ingest, e.g., ingest 500 sample files per hang type for two most recent builds. Stacks that are not app-specific are removed 1206, e.g., stacks that occur only inside a kernel 120 which is not under investigation (a.k.a. "safe" stacks). Remaining stacks from all files are saved into one text file.

Next, during a Feature Engineering phase, frames 1308 in each stack are collapsed 1204 to allow app-specific frames to bubble up (i.e., have greater visibility to an analyst). The system 400 selects the top X and bottom Y frames per stack. To convert stacks into paragraphs as part of vectorization 1316, the system concatenates frames on a per-stack basis with white space as a delimiter, thereby converting the stack trace 212 into a paragraph of text with frames as words in the paragraph. This may be accomplished in parts: module name shortening, followed by collapsing adjacent module names, followed by any top X or bottom Y clippings.

Next, during a Text Clustering phase, cosine similarity 410 is used with TF-IDF normalized feature vectors 1312; the features are the stack frames. Hierarchical agglomerative clustering 704 is performed, and the system stores the results of clustering (in this example as a csv file) in a database 112 (in this case the Microsoft Azure® Cosmos database; mark of Microsoft Corporation).

Next, during a Ranking of Clusters phase, a default weight of 1 per stack is assigned to clusters. This default is overridden by assigning a custom weight to stacks with important threads, e.g., a stack for a user interface thread has weight 10. Of course, other implementations may use different weighting. The cluster with the highest weight is highest priority for review by the analyst.

Finally, during a Visualization phase, results 418 are presented, e.g., in Microsoft PowerBI® software, for interactive analytics. Paragraphs are converted to stacks for presentation, by replacing the spaces between frames in each stack with newlines.

In many computing environments, hang dump files 1002 are created as binary files (i.e., not human readable). In Windows® computing environments these include .dmp files, which can be opened and analyzed using a debugger 122 (mark of Microsoft Corporation). These dump files are not human readable without using a tool (debugger). In some environments 204, the binary hang dump files are processed by familiar tools to produce human readable stack traces 212 that look like the examples above of an idle user interface thread and a thread involving a lock.

Pruning 1202 is applied to remove routines that are not specific to the target app being debugged. Then each pruned stack trace is vectorized 1316 into a bag of words 1318. Each resulting vector looks something like this, using text from FIG. 14 as an example:

("win32!":1, "user32!":1, "combase!":3, "rpert4!":2, "SHCore!":2, . . . ,

"Windows_UI_Xaml!ctl::ComPtr<Windows::Storage::Streams::IRandomAccessStream>::operator=":1, . . . )

Then the vectors 1312 are agglomerated 704 into clusters 404, to produce a dendogram 1102. The dendogram is a tree of cluster nodes, with each node being a data structure that identifies the vectors which belong to 1208 that cluster, and each cluster node having a link to a larger cluster that it is part of, as illustrated e.g., in FIG. 11.

Then the clusters are ranked 1008. A rank value, linked list pointer(s), or other fields in the dendogram node/cluster data structure may be used to support ranking of clusters.

Then the highest ranked cluster is presented 1018 to the developer for investigation. This involves displaying 1018 pruned call stack text, which looks like the example above of a pruned 1202 thread trace 212 which is waiting to suspend, or the example in FIG. 14. All of the clusters 404 may be presented to the developer for investigation. However, the ranking 1008 "bubbles up" the most promising ones so that typically a developer only has to look at the top few to get valuable information about the likely root cause(s) of the hang(s) being investigated.

In some situations, the event data 210 will include information reflecting two or more underlying problems in a program 206. For example, execution may have ended in a crash one time and in a hang another time. Or the program may hang due to one cause for one execution, and hang due to another cause during another execution. Tools and techniques taught herein are nonetheless useful. Suppose two different hangs from two different causes both show up in the reduced data set 216. The data set clusters (which are much smaller than the full set of threads) likely include useful information about both hang causes. The relative hit count on the two different hangs will determine which one sorts 1008 to the top. The one with more hits will sort higher. This is in fact a good quality, because it helps developers fix the most impactful problems first.

In some implementations, a tab separated value (.tsv) file contains raw data that is used as an input to the clustering algorithm. This file is produced after pruning and collapsing and excluding, but before clustering. By way of illustration, one such spreadsheet includes several thousand rows with column headers and example cell data as follows:

FileName (e.g., "02f1d967-dedf-4423-a69c-0c9dd165b8ad.deduped.txt"),
HangType (e.g., quiesce, navigation), BuildNumber (e.g., 18865), StackNumber
(e.g., integer 0 . . . n), DuplicateCount (e.g., integer 0 . . . m), MyTextForAnalysis (e.g., "ntdll!
WindowsInternal_ComposableShell_Experiences_Appointments!WindowsInternal::ComposableShell::Experiences:: Appointments::AppointmentListViewModel::On Suspending",
"WindowsInternal_ComposableShell_Experiences_ApppointmentsrWindows::Foundation::EventHandler& ItPlatform::Object.ˆ>::EventHandler&ItPlatform::Object.ˆ>&ItWindowsInternal::ComposableShell::Experiences:: Appointments::Appoint mentListViewModel.void.(_cdecl. WindowsInternal::ComposableShell::Experiences::Appoi ntments::AppointmentListViewModel::*)", "ntdll! KERNELBASE!
twinapi_appcore!WaitCoalesced
twinapi_appcore!Event::WaitWithFreeUnusedLibraries
twinapi_appcore!&Itlambda>::operator
twinapi_appcore!Windows::ApplicationModel::Core:: CoreApplicationFactory::Run
Windows_UI_Xaml!RunInActivationMode
Windows_UI_Xaml!DirectUI::FrameworkApplicationFactory::Start zStartApp!main zStartApp!_main zStartApp!_scrt_common_main_seh ntdll!", . . . )

Some Additional Combinations and Variations

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

In some embodiments, event data 210 includes events which correspond to stacks, stack frames are considered examples of event data, and clusters of stacks correspond to clusters of events. In some such embodiments, pruning occurs at the granularity of event data, in that stack frames are pruned within respective stacks. The pruned data is then collapsed, and then condensed.

In one view of such embodiments, pruning is domain-specific, e.g., the embodiment prunes a stack frame if the stack frame belongs to a generic module found in a pre-defined list of generic modules. In this view, collapsing is not domain-specific, but condensing by cutting out interior frames is domain-specific. These embodiments and other embodiments described herein may also be viewed in other ways, e.g., without regard to whether operations are domain-specific.

CONCLUSION

In short, the teachings provided herein may be applied to enhance data reduction functionality of a computing system 400. Dump file content 1002 and other event data 210 is pruned 1202 and prioritized 1008 to assist 1210 analysis of hangs 1338, crashes 1340, 1342, and other circumstances 218. An event data pruner 412 condenses 1204 or excludes 1206 certain event data, resulting in reduced event data 216. A cluster creator 406 creates clusters 404 from pruned 1202 and vectorized 1316 event data 210, using a clustering algorithm 408 and a similarity metric 410, without 1314 any prior specification of the desired number of clusters. A cluster ranker 414 ranks 1008 clusters 404 according to event data volume 804 and thread importance 808, thus prioritizing 1008 the event data for inspection 1212. A results presenter 420 configures a user interface 416 to present 1018 ranked clusters 404, their associated data 216, 210, data reduction statistics 902, 904, 906, 908, 910, 912, regression analysis 1350 results, and other data reduction processing results 418. Thus, the innovative functionality assists 1210 analysis 1214 and prioritized inspection 1212 of event data 210 by an analyst 104, by surfacing organized event data that is relevant to the circumstance 218 under investigation, or supporting comparison of clusters 404 from before and after a change in the circumstance (e.g., another build), or doing both.

Embodiments are understood to also include or benefit from tested and appropriate security controls and privacy controls such as the General Data Protection Regulation (GDPR), e.g., it is understood that appropriate measures should be taken to help prevent misuse of the event set and help avoid tampering with the behavior analysis. Use of the tools and techniques taught herein is compatible with use of such controls.

Although particular embodiments are expressly illustrated and described herein as processes, as configured storage media, or as systems, it will be appreciated that discussion of one type of embodiment also generally extends to other embodiment types. For instance, the descriptions of processes in connection with FIGS. 10, 12 and 13 also help describe configured storage media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific APIs, specific fields, specific kinds of components, and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A system configured with prune-and-prioritize functionality to assist analysis of event data which relates to a circumstance that is under investigation by an analyst, the system comprising:
    a digital memory;
    a digital processor in operable communication with the memory;
    an event data pruner which upon execution by the processor prunes event data which resides at least partially in the memory, thereby condensing event data or excluding event data or doing both;
    a similarity metric which upon execution by the processor quantifies similarity of two or more clusters;
    a cluster creator which upon execution by the processor creates clusters based on pruned event data, the cluster creator configured to create clusters according to a clustering algorithm by using the similarity metric, the cluster creator configured to generate a dendrogram using a hierarchical clustering algorithm and a dynamically calculated dendrogram cutoff which delimits a set of clusters to be ranked;
    a cluster ranker which upon execution by the processor ranks clusters according to one or more factors, thereby prioritizing event data of clusters for inspection;
    a user interface; and
    a results presenter which upon execution by the processor configures the user interface to present at least a portion of the pruned event data of at least some clusters according to their cluster ranks;
    whereby the system assists analysis and prioritized inspection of event data by the analyst, by surfacing organized event data that is relevant to the circumstance or by supporting comparison of clusters from before and after a change in the circumstance, or both.

2. The system of claim 1, wherein the event data configures at least a portion of the digital memory, and wherein the event data includes at least one of the following:
    stack data containing call stack traces of threads of a computational process; or
    log data containing activity or status traces of entities of a monitored environment.

3. The system of claim 1, wherein the cluster creator is configured to create clusters according to at least one of the following similarity metrics:
    a cosine similarity metric; or
    a Jaccard similarity metric.

4. The system of claim 1, wherein the cluster creator is configured to create clusters using a hierarchical agglomerative clustering algorithm.

5. The system of claim 1, wherein the cluster ranker is configured to rank clusters according to one or more of the following factors:
    an event data volume which is associated with a cluster; or
    a presence in event data associated with a cluster of event data which belongs to one or more event data categories which are specified as having high importance.

6. The system of claim 1, wherein the event data includes stack data containing call stack traces of at least thirty threads of a computational process.

7. The system of claim 1, wherein the user interface includes at least two of the following when the user interface has been configured by the results presenter:
- statistical information indicating an amount of event data processed by the system;
- statistical information indicating a number of clusters created by the system;
- regression information indicating an amount of previously unseen event data;
- confidence information indicating a level of confidence for an association of event data with a cluster; or
- unclustered data information identifying event data which the cluster creator did not associate with any cluster.

8. A method utilizing prune-and-prioritize functionality for assisting analysis of event data which relates to a circumstance that is under investigation by an analyst, the method comprising:
- pruning the event data by condensing at least some of the event data or by excluding at least some of the event data or by doing both, wherein the event data comprises call stack data and the pruning provides a data reduction ratio of at least ten to one, where the data reduction ratio is calculated as the number of call stack traces relative to the number of clusters;
- automatically creating clusters based on pruned event data, the clusters being created according to a similarity metric by using a clustering algorithm without relying on a k-means clustering or otherwise requiring a prior specification of the number of clusters to create;
- ranking at least some of the clusters according to one or more factors, thereby prioritizing event data of clusters for inspection; and
- presenting through a user interface at least a portion of the pruned event data of at least some clusters according to their cluster ranks;
- whereby the method assists analysis by surfacing organized event data that is relevant to the circumstance, thus allowing prioritized inspection of event data by the analyst.

9. The method of claim 8, wherein pruning the event data comprises at least one of the following:
- condensing a call stack frame which includes a module name and one or more routine names, by excluding the routine names and keeping the module name;
- condensing multiple adjacent call stack frames, which each include the same module name, into a single call stack frame which includes that module name.

10. The method of claim 8, wherein pruning the event data comprises excluding one or more call stack frames from an interior portion of a call stack trace.

11. The method of claim 8, wherein automatically creating clusters based on pruned event data comprises at least one of the following:
- vectorizing a call stack trace as a textual bag-of-words;
- normalizing a vector based on term frequency-inverse document frequency; or
- quantifying similarity of two or more vectors using a similarity metric.

12. The method of claim 8, wherein automatically creating clusters based on pruned event data comprises generating a dendrogram using a hierarchical clustering algorithm, and wherein the method further comprises dynamically calculating a dendrogram cutoff which delimits a set of clusters to be ranked.

13. The method of claim 8, wherein the method further comprises obtaining for pruning event data which includes multiple call stack traces of respective threads of a process after a determination that the process satisfied a hang condition.

14. The method of claim 8, wherein the method further comprises obtaining for pruning event data which includes multiple call stack traces of respective user interface threads of a process.

15. The method of claim 8, wherein the clusters are created without using a k-means clustering or a prior specification of the number of clusters to create.

16. A computer-readable storage medium configured with data and instructions which upon execution perform a prune-and-prioritize method for assisting analysis of a large collection of event data which relates to a circumstance that is under investigation by an analyst, the method comprising:
- pruning the large collection of event data down to a small collection of event data by condensing at least some of the event data or by excluding at least some of the event data or by doing both, and wherein pruning the event data comprises at least one of the following condensing activities:
- condensing a call stack frame which includes a module name and one or more routine names, by excluding the routine names and keeping the module name, or condensing multiple adjacent call stack frames, which each include the same module name, into a single call stack frame which includes that module name;
- vectorizing at least a portion of the pruned event data, thereby producing vectors;
- automatically creating clusters based on at least some of the vectors, the clusters being created according to a similarity metric by using a clustering algorithm;
- ranking at least some of the clusters according to one or more factors, thereby prioritizing event data of vectors of clusters for inspection; and
- presenting through a user interface at least a portion of the pruned event data of at least some vectors of at least some clusters according to their cluster ranks;
- whereby the method assists analysis by surfacing organized event data that is relevant to the circumstance, thus allowing prioritized inspection of event data by the analyst.

17. The storage medium of claim 16, wherein a process which hung had multiple threads, the event data relates to an investigation into why the process hung, and the event data includes call stack traces of at least ninety percent of the threads of the process.

18. The storage medium of claim 16, wherein a build which executed had multiple threads with corresponding call stack traces, the event data relates to an investigation into execution of the build, and the method further comprises performing a regression analysis which indicates an amount of call stack traces generated by execution of the build that were not generated by execution of at least one different build.

19. The storage medium of claim 16, wherein the event data includes call stack traces of threads of a target application program, and wherein pruning includes condensing a call stack frame which includes a module name and also includes one or more routine names of routines which are not specific to the target application program, by excluding those routine names and keeping the module name.

20. The storage medium of claim 16, wherein the event data includes call stack traces of threads of at least two different target application programs whose respective executions each include calls to routines of a single underlying platform, and wherein creating clusters includes associating pruned event data from executions of different target application programs with the same cluster.

* * * * *